(12) United States Patent
Terada et al.

(10) Patent No.: US 12,515,669 B2
(45) Date of Patent: Jan. 6, 2026

(54) TRAVEL ASSISTANCE DEVICE

(71) Applicant: DENSO CORPORATION, Kariya (JP)

(72) Inventors: Ryota Terada, Kariya (JP); Atsushi Baba, Kariya (JP)

(73) Assignee: DENSO CORPORATION, Kariya (JP)

( * ) Notice: Subject to any disclaimer, the term of this patent is extended or adjusted under 35 U.S.C. 154(b) by 197 days.

(21) Appl. No.: 18/350,541

(22) Filed: Jul. 11, 2023

(65) Prior Publication Data
US 2023/0347898 A1 Nov. 2, 2023

Related U.S. Application Data

(63) Continuation of application No. PCT/JP2021/044131, filed on Dec. 1, 2021.

(30) Foreign Application Priority Data

Jan. 15, 2021 (JP) .................................. 2021-005104

(51) Int. Cl.
*B60W 30/12* (2020.01)
*B60W 30/18* (2012.01)

(52) U.S. Cl.
CPC ... *B60W 30/18159* (2020.02); *B60W 2552/05* (2020.02); *B60W 2555/60* (2020.02); *B60W 2556/40* (2020.02); *B60W 2556/45* (2020.02)

(58) Field of Classification Search
CPC ....... B60W 30/18159; B60W 2556/40; B60W 2556/45; B60W 2555/60; B60W 2552/05
See application file for complete search history.

(56) References Cited

U.S. PATENT DOCUMENTS

| 2009/0326751 A1* | 12/2009 | Otake | ...................... | B60T 7/22 |
| | | | | 701/25 |
| 2012/0277990 A1* | 11/2012 | Gottsch | ................. | B60W 40/06 |
| | | | | 701/408 |
| 2013/0110316 A1* | 5/2013 | Ogawa | ............. | G08G 1/096725 |
| | | | | 701/1 |
| 2015/0203126 A1* | 7/2015 | Kobana | ................. | B60W 50/12 |
| | | | | 701/1 |
| 2015/0211868 A1* | 7/2015 | Matsushita | ........ | G01C 21/3638 |
| | | | | 701/457 |
| 2015/0360685 A1* | 12/2015 | Uno | ......................... | B60T 7/12 |
| | | | | 701/1 |

(Continued)

FOREIGN PATENT DOCUMENTS

| CN | 112001986 A | 11/2020 |
| JP | 2020-008681 A | 1/2020 |

*Primary Examiner* — Peter D Nolan
*Assistant Examiner* — Wae L Louie
(74) *Attorney, Agent, or Firm* — Maschoff Brennan

(57) ABSTRACT

A travel assistance device includes a specifying unit configured to specify an entry node of an entry lane connected to an intersection and an exit node of an exit lane connected to the intersection based on map data including information of the intersection and a setting unit configured to set virtual connection objects each of which is a guide for the vehicle to travel and connects the entry node and the exit node. The setting unit is further configured to set a combination of the virtual connection objects where simultaneous traffic by vehicles may occur to not satisfy an avoidance condition except for a combination of the virtual connection objects where the avoidance condition is inevitably satisfied.

11 Claims, 28 Drawing Sheets

(56) References Cited

U.S. PATENT DOCUMENTS

| | | | |
|---|---|---|---|
| 2016/0035223 A1* | 2/2016 | Gutmann | B60W 30/09 340/907 |
| 2016/0114800 A1* | 4/2016 | Shimizu | B60W 30/18027 701/70 |
| 2016/0161271 A1* | 6/2016 | Okumura | B60W 30/18154 701/25 |
| 2016/0318490 A1* | 11/2016 | Ben Shalom | B60T 7/22 |
| 2018/0148052 A1* | 5/2018 | Suto | B60W 40/06 |
| 2020/0001875 A1* | 1/2020 | Kato | G01C 21/3602 |
| 2020/0208998 A1* | 7/2020 | Xiang | G06F 16/29 |
| 2021/0182575 A1* | 6/2021 | Murakami | B60W 60/001 |
| 2021/0300410 A1* | 9/2021 | Dorum | G08G 1/056 |
| 2024/0416902 A1* | 12/2024 | Schnarr | B60W 30/09 |
| 2024/0416908 A1* | 12/2024 | Taniguchi | B60W 30/10 |
| 2024/0416945 A1* | 12/2024 | Kume | B60W 30/18159 |
| 2025/0083676 A1* | 3/2025 | Lau | B60W 60/0027 |
| 2025/0091609 A1* | 3/2025 | Mahadevan | B60W 50/14 |

* cited by examiner

TRAVEL ASSISTANCE DEVICE

CROSS REFERENCE TO RELATED APPLICATIONS

This application is a continuation application of International Patent Application No. PCT/JP2021/044131 filed on Dec. 1, 2021, which designated the U.S. and claims the benefit of priority from Japanese Patent Application No. 2021-005104 filed on Jan. 15, 2021. The entire disclosure of all of the above application is incorporated herein by reference.

TECHNICAL FIELD

The present disclosure relates to a technique for assisting in parking of a vehicle.

BACKGROUND ART

There has been known a device for setting a vehicle travelable area in a road section where no lane marking exists. Based on map data, the device generates virtual lane lines that connect terminal nodes of the lane lines in the entry lane and the terminal nodes of the lane lines in the exit lane on a road section. Then, the device sets an area defined between the virtual lane lines as a travelable area.

SUMMARY

One aspect of the present disclosure is a travel assistance device that assists in traveling for a vehicle. The device includes: a specifying unit that is configured to specify an entry node of an entry lane connected to an intersection and an exit node of an exit lane connected to the intersection based on map data including information of the intersection, the entry node being an end node of the entry lane at the intersection and the exit node being an end node of the exit lane at the intersection; and a setting unit that is configured to set virtual connection objects each of which is a guide for the vehicle to travel and connects the entry node and the exit node. An avoidance condition is defined as at least one of a condition that the virtual connection objects are close to each other within an avoidance range and a condition that the virtual connection objects overlap with each other. The setting unit is further configured to set a combination of the virtual connection objects where simultaneous traffic by vehicles may occur to not satisfy the avoidance condition except for a combination of the virtual connection objects where the avoidance condition is inevitably satisfied. A combination of a virtual connection object that is a guide for right-turning travel from a specific side at the intersection and a virtual connection object that is a guide for right-turning travel from an opposing side at the intersection opposite to the specific side is defined as an opposing right-turn combination under a left-hand traffic environment. A combination of a virtual connection object that is a guide for left-turning travel from the specific side at the intersection and a virtual connection object that is a guide for left-turning travel from the opposing side at the intersection is defined as an opposing left-turn combination under a right-hand traffic environment. The setting unit is configured to set the virtual connection objects to not satisfy the avoidance condition for at least one of the opposing right-turn combination and the opposing left-turn combination.

BRIEF DESCRIPTION OF DRAWINGS

Objects, features and advantages of the present disclosure will become more apparent from the following detailed description made with reference to the accompanying drawings.

DESCRIPTION OF EMBODIMENTS

Figure 1:
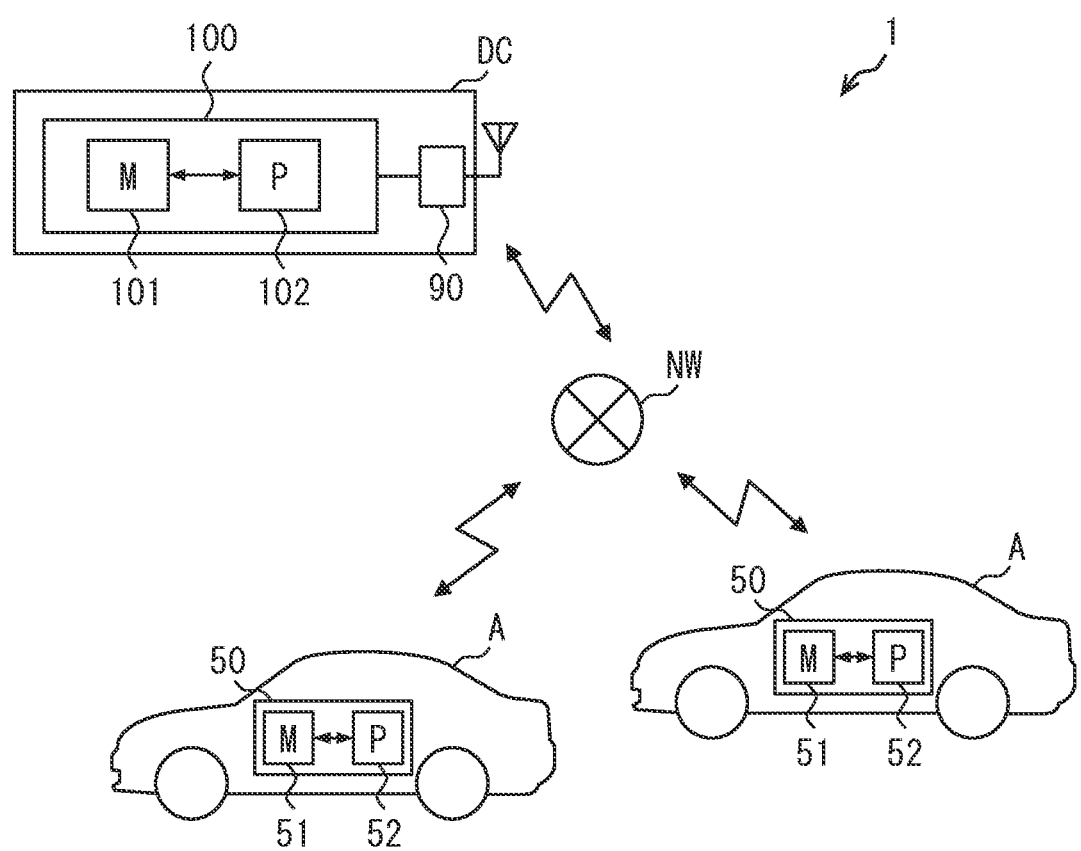
FIG. 1 is a diagram illustrating an automated-driving control system including a server device.
Figure 2:
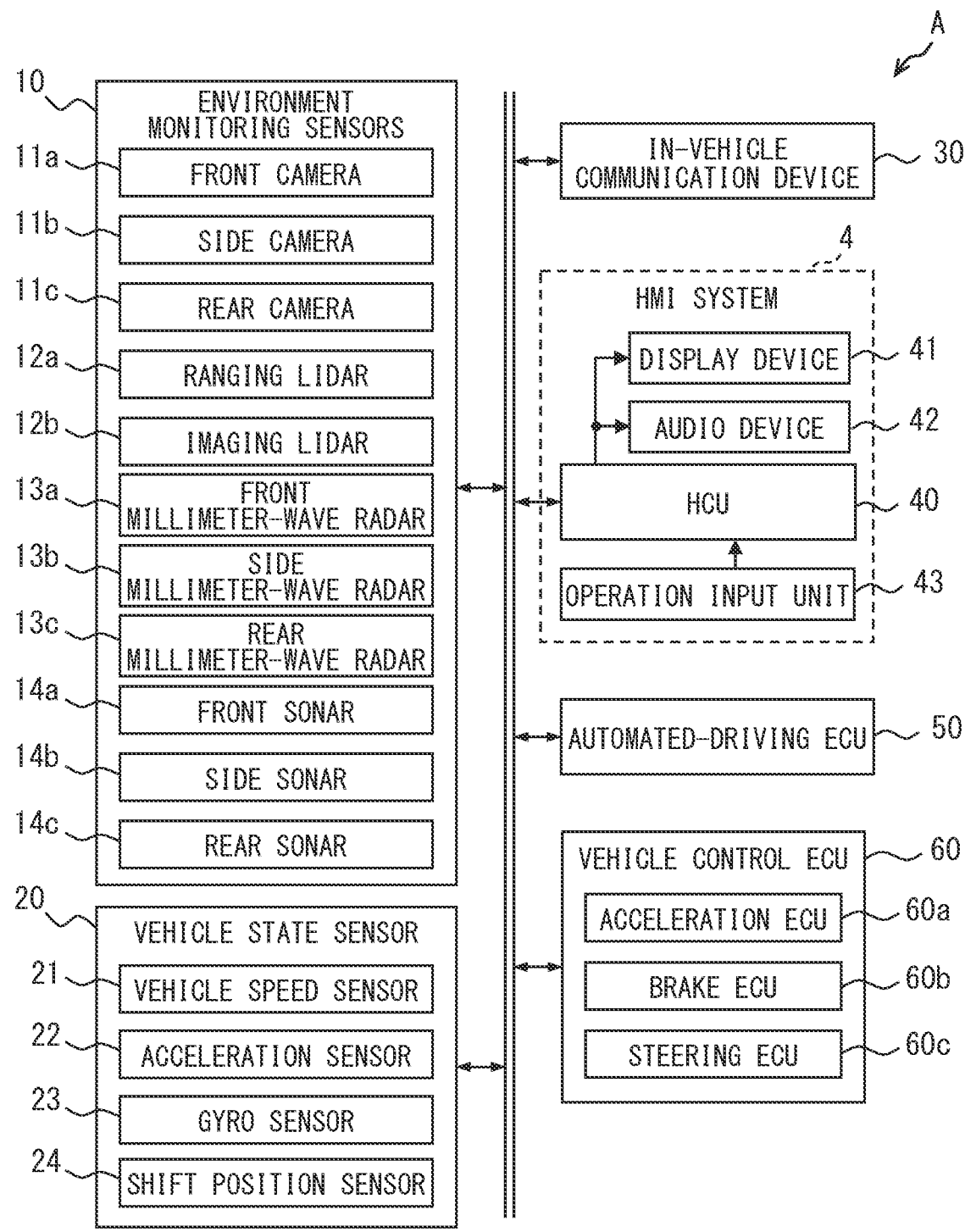
FIG. 2 is a block diagram showing an overall configuration of a vehicle.

To begin with, a relevant technology will be described only for understanding the following embodiments.

The above-described device does not consider a situation in which multiple vehicles travel on the road section. Under such a circumstance, if a travelable area is set for each vehicle, the travelable areas may overlap with each other. If the vehicles travel based on overlapping travelable areas, traffic flow would not be smooth.

One of objectives of the disclosure is to provide a travel assistance device and a travel assistance method for realizing smooth traffic flow for a plurality of vehicles.

According to a first aspect of the present disclosure, a travel assistance device is configured to assist in traveling for a vehicle. The device includes: a specifying unit that is configured to specify an entry node of an entry lane connected to an intersection and an exit node of an exit lane connected to the intersection based on map data including information of the intersection, the entry node being an end node of the entry lane at the intersection and the exit node being an end node of the exit lane at the intersection; and a setting unit that is configured to set virtual connection objects each of which is a guide for the vehicle to travel and connects the entry node and the exit node. An avoidance condition is defined as at least one of a condition that the virtual connection objects are close to each other within an avoidance range and a condition that the virtual connection objects overlap with each other. The setting unit is further configured to set a combination of the virtual connection objects where simultaneous traffic by vehicles may occur to not satisfy the avoidance condition except for a combination of the virtual connection objects where the avoidance condition is inevitably satisfied. A combination of a virtual connection object that is a guide for right-turning travel from a specific side at the intersection and a virtual connection object that is a guide for right-turning travel from an opposing side at the intersection opposite to the specific side is defined as an opposing right-turn combination under a left-hand traffic environment. A combination of a virtual connection object that is a guide for left-turning travel from the specific side at the intersection and a virtual connection object that is a guide for left-turning travel from the opposing side at the intersection is defined as an opposing left-turn combination under a right-hand traffic environment. The setting unit is configured to set the virtual connection objects to not satisfy the avoidance condition for at least one of the opposing right-turn combination and the opposing left-turn combination.

According to a second aspect of the present disclosure, a travel assistance device assists in traveling for a vehicle. The device includes: a specifying unit that is configured to specify an entry node of an entry lane connected to an intersection and an exit node of an exit lane connected to the intersection based on map data including information of the intersection, the entry node being an end node of the entry lane at the intersection and the exit node being an end node of the exit lane at the intersection; and a setting unit that is configured to set virtual connection objects each of which is a guide for the vehicle to travel and connects the entry node and the exit node. An avoidance condition is defined as at least one of a condition that the virtual connection objects are close to each other within an avoidance range and a condition that the virtual connection objects overlap with each other. The setting unit is further configured to set a combination of the virtual connection objects where simultaneous traffic by vehicles may occur to not satisfy the avoidance condition except for a combination of the virtual connection objects where the avoidance condition is inevitably satisfied. A combination of a virtual connection object that is a guide for right-turning travel from a specific side to a right-turn side at the intersection and a virtual connection object that is a guide for left-turning travel from the right-turn side to the specific side at the intersection is defined as a first combination under a left-hand traffic environment. A combination of a virtual connection object that is a guide for left-turning travel from the specific side to a left-turn side at the intersection and a virtual connection object that is a guide for right-turning travel from the turn-left side to the specific side at the intersection is defined as a second combination under a right-hand traffic environment. The setting unit is configured set the virtual connection objects to not satisfy the avoidance condition for at least one of the first combination and the second combination.

According to a third aspect of the present disclosure, a travel assistance device assists in traveling for a vehicle. The device includes: a specifying unit that is configured to specify entry nodes of an entry lane connected to an intersection and exit nodes of an exit lane connected to the intersection based on map data including information of the intersection, each of the entry nodes being an end node of the entry lane at the intersection and each of the exit nodes being an end node of the exit lane at the intersection; and a setting unit that is configured to set virtual connection objects a number in accordance with a combination of the entry nodes and the exit nodes, each of the virtual connection objects being a guide for the vehicle to travel and connecting the entry nodes and the exit nodes. For a combination of two virtual connection objects connecting different entry nodes and different exit nodes where simultaneous traffic by vehicles may occur according to a traffic rule, the two virtual connection objects are prohibited from partially crossing each other except for a combination of virtual connection objects between which crossing is physically unavoidable. A combination of a virtual connection object that is a guide for right-turning travel from a specific side at the intersection and a virtual connection object that is a guide for right-turning travel from an opposing side at the intersection opposite to the specific side is defined as an opposing right-turn combination under a left-hand traffic environment. A combination of a virtual connection object that is a guide for left-turning travel from the specific side at the intersection and a virtual connection object that is a guide for left-turning travel from the opposing side at the intersection is defined as an opposing left-turn combination under a right-hand traffic environment. An avoidance condition is defined as at least one of a condition that the virtual connection objects are close to each other within an avoidance range and a condition that the virtual connection objects overlap with each other. The setting unit is further configured to set the virtual connection objects to not satisfy the avoidance condition for at least one of the opposing right-turn combination and the opposing left-turn combination.

According to a fourth aspect of the present disclosure, a travel assistance device assists in traveling for a vehicle. The device includes: a specifying unit that is configured to specify entry nodes of an entry lane connected to an intersection and exit nodes of an exit lane connected to the intersection based on map data including information of the intersection, each of the entry nodes being an end node of the entry lane at the intersection and each of the exit nodes being an end node of the exit lane at the intersection; and a setting unit that is configured to set virtual connection objects a number in accordance with a combination of the entry nodes and the exit nodes, each of the virtual connection objects being a guide for the vehicle to travel and connecting the entry nodes and the exit nodes. For a combination of two virtual connection objects connecting different entry nodes and different exit nodes where simultaneous traffic by vehicles may occur according to a traffic rule, the two virtual connection objects are prohibited from partially crossing each other except for a combination of virtual connection objects between which physical crossing is unavoidable. A combination of a virtual connection object that is a guide for right-turning travel from a specific side to a right-turn side at the intersection and a virtual connection object that is a guide for left-turning travel from the right-turn side to the specific side at the intersection is defined as a first combination under a left-hand traffic environment. A combination of a virtual connection object that is a guide for left-turning travel from the specific side to a left-turn side at the intersection and a virtual connection object that is a guide for right-turning travel from the turn-left side to the specific side at the intersection is defined as a second combination under a right-hand traffic environment. An avoidance condition is defined as at least one of a condition that the virtual connection objects are close to each other within an avoidance range and a condition that the virtual connection objects overlap with each other. The setting unit is configured set the virtual connection objects to not satisfy the avoidance condition for at least one of the first combination and the second combination.

According to a fifth aspect of the present disclosure, a travel assistance method is implemented by a processor to assist in traveling for a vehicle. The method includes: specifying an entry node of an entry lane connected to an intersection and an exit node of an exit lane connected to the intersection based on map data including information of the intersection, the entry node being an end node of the entry lane at the intersection and the exit node being an end node of the exit lane at the intersection; and setting virtual connection objects each of which is a guide for the vehicle to travel and connects the entry node and the exit node. An avoidance condition is defined as at least one of a condition that the virtual connection objects are close to each other within an avoidance range and a condition that the virtual connection objects overlap with each other. Setting the virtual connection objects further includes setting a combination of the virtual connection objects where simultaneous traffic by vehicles may occur to not satisfy the avoidance condition except for a combination of the virtual connection objects where the avoidance condition is inevitably satisfied. A combination of a virtual connection object that is a guide for right-turning travel from a specific side at the intersection and a virtual connection object that is a guide for right-turning travel from an opposing side at the intersection opposite to the specific side is defined as an opposing right-turn combination under a left-hand traffic environment. A combination of a virtual connection object that is a guide for left-turning travel from the specific side at the intersection and a virtual connection object that is a guide for left-turning travel from the opposing side at the intersection is defined as an opposing left-turn combination under a right-hand traffic environment. Setting the virtual connection objects further includes setting the virtual connection objects to not satisfy the avoidance condition for at least one of the opposing right-turn combination and the opposing left-turn combination.

According to a sixth aspect of the present disclosure, a travel assistance method is implemented by a processor to assist in traveling for a vehicle. The method includes: specifying an entry node of an entry lane connected to an intersection and an exit node of an exit lane connected to the intersection based on map data including information of the intersection, the entry node being an end node of the entry lane at the intersection and the exit node being an end node of the exit lane at the intersection; and setting virtual connection objects each of which is a guide for the vehicle to travel and connects the entry node and the exit node. An avoidance condition is defined as at least one of a condition that the virtual connection objects are close to each other within an avoidance range and a condition that the virtual connection objects overlap with each other. Setting the virtual connection objects further includes setting a combination of the virtual connection objects where simultaneous traffic by vehicles may occur to not satisfy the avoidance condition except for a combination of the virtual connection objects where the avoidance condition is inevitably satisfied. A combination of a virtual connection object that is a guide for right-turning travel from a specific side to a right-turn side at the intersection and a virtual connection object that is a guide for left-turning travel from the right-turn side to the specific side at the intersection is defined as a first combination under a left-hand traffic environment. A combination of a virtual connection object that is a guide for left-turning travel from the specific side to a left-turn side at the intersection and a virtual connection object that is a guide for right-turning travel from the turn-left side to the specific side at the intersection is defined as a second combination under a right-hand traffic environment. Setting the virtual connection objects further includes setting the virtual connection objects to not satisfy the avoidance condition for at least one of the first combination and the second combination.

According to a seventh aspect of the present disclosure, a travel assistance method is implemented by a processor to assist in traveling for a vehicle. The method includes: specifying an entry node of an entry lane connected to an intersection and an exit node of an exit lane connected to the intersection based on map data including information of the intersection, the entry node being an end node of the entry lane at the intersection and the exit node being an end node of the exit lane at the intersection; and setting virtual connection objects a number in accordance with a combination of the entry nodes and the exit nodes, each of the virtual connection objects being a guide for the vehicle to travel and connecting the entry nodes and the exit nodes. For a combination of two virtual connection objects connecting different entry nodes and different exit nodes where simultaneous traffic by vehicles may occur according to a traffic rule, setting the virtual connection objects further includes prohibiting the two virtual connection objects from partially crossing each other except for a combination of virtual connection objects between which physical crossing is unavoidable. A combination of a virtual connection object that is a guide for right-turning travel from a specific side at the intersection and a virtual connection object that is a guide for right-turning travel from an opposing side at the intersection opposite to the specific side is defined as an opposing right-turn combination under a left-hand traffic environment. A combination of a virtual connection object that is a guide for left-turning travel from the specific side at the intersection and a virtual connection object that is a guide for left-turning travel from the opposing side at the intersection is defined as an opposing left-turn combination under a right-hand traffic environment. An avoidance condition is defined as at least one of a condition that the virtual connection objects are close to each other within an avoidance range and a condition that the virtual connection objects overlap with each other. Setting the virtual connection objects further includes set the virtual connection objects to not satisfy the avoidance condition for at least one of the opposing right-turn combination and the opposing left-turn combination.

According to an eighth aspect of the present disclosure, a travel assistance method is implemented by a processor to assist in traveling for a vehicle. The method includes: specifying an entry node of an entry lane connected to an intersection and an exit node of an exit lane connected to the intersection based on map data including information of the intersection, the entry node being an end node of the entry lane at the intersection and the exit node being an end node of the exit lane at the intersection; and setting virtual connection objects a number in accordance with a combination of the entry nodes and the exit nodes, each of the virtual connection objects being a guide for the vehicle to travel and connecting the entry nodes and the exit nodes. For a combination of two virtual connection objects connecting different entry nodes and different exit nodes where simultaneous traffic by vehicles may occur according to a traffic rule, setting the virtual connection objects further includes prohibiting the two virtual connection objects from partially crossing each other except for a combination of virtual connection objects between which physical crossing is unavoidable. A combination of a virtual connection object that is a guide for right-turning travel from a specific side to a right-turn side at the intersection and a virtual connection object that is a guide for left-turning travel from the right-turn side to the specific side at the intersection is defined as a first combination under a left-hand traffic environment. A combination of a virtual connection object that is a guide for left-turning travel from the specific side to a left-turn side at the intersection and a virtual connection object that is a guide for right-turning travel from the turn-left side to the specific side at the intersection is defined as a second combination under a right-hand traffic environment. An avoidance condition is defined as at least one of a condition that the virtual connection objects are close to each other within an avoidance range and a condition that the virtual connection objects overlap with each other. Setting the virtual connection objects further includes setting the virtual connection objects to not satisfy the avoidance condition for at least one of the first combination and the second combination.

According to the above-described aspects, for combinations of virtual connection objects where simultaneous traffic by vehicles is determined to occur, the virtual connection objects are set so as to not satisfy an avoidance condition except for combinations where the avoidance condition is inevitably satisfied. Therefore, even if a plurality of vehicles travel along the plurality of virtual connection objects, a lateral distance between the vehicles can be sufficiently secured. Therefore, the vehicles can travel smoothly. Accordingly, a travel assistance device and a travel assistance method for realizing smooth traffic flow for a plurality of vehicles can be provided.

First Embodiment

A server device 100 according to the first embodiment will be described with reference to FIGS. 1 to 17. It should be noted that the following description applies to a country or region where left-hand traffic is legally allowed, that is, to a left-hand traffic environment.

The server device 100 is installed in a center DC. The server device 100 constitutes an automated-driving control system 1 of a vehicle A together with an automated-driving ECU 50 mounted in the vehicle. The center DC and each of the vehicles A are configured to be able to wirelessly communicate with each other via a network NW.

The automated-driving ECU 30 is an electronic control unit that performs at least one of an autonomous driving function and an advanced driving assist function. The automated-driving ECU 50 is connected to environment monitoring sensors 10 mounted in the vehicle, vehicle state sensors 20, an in-vehicle communication device 30, an HCU ((Human Machine Interface) Control Unit) 40, and a vehicle control ECU 60 via a communication bus or the like.

The environment monitoring sensor 10 is an autonomous sensor that monitors a surrounding environment of the vehicle A. The environment monitoring sensors include at least one type of environment monitoring cameras 11a, 11b, 11c, LiDAR (Light Detection and Ranging/Laser Imaging Detection and Ranging) 12a, 12b, millimeter wave radars 13a, 13b, 13c, and sonars 14a, 14b, 14c. The environment monitoring cameras 11a, 11b, and 11c are imaging devices that capture a view of outside within a predetermined range. The environment monitoring cameras 11a, 11b, and 11c include, for example, a front camera 11a having a imaging range in front of the vehicle A, side A camera 11b having an imaging range on side A of the vehicle A, and a rear camera 11c having an imaging range behind the vehicle A. It should be noted that an environment monitoring camera capable of imaging a wider range covering the above-described imaging ranges may be used alternatively.

The LiDARs 12a and 12b detect a point group of characteristic points of a feature by emitting laser light and detecting light reflected by the feature. The LiDARs 12a, 12b include a ranging LiDAR 12a that measures a distance to a reflector and an imaging LiDAR 12b that can perform three-dimensional imaging of the reflector. A LiDAR having both functions of the LiDARs 12a and 12b may be used. The millimeter wave radars 13a, 13b, and 13c generate detection information of the surrounding environment by receiving reflected waves of emitted millimeter waves or quasi-millimeter waves. The millimeter-wave radars 13a, 13b, and 13c include, for example, a front millimeter-wave radar 13a having a detection range in front of the vehicle A, side A millimeter-wave radar 13b having a detection range on side A of the vehicle A, and a rear millimeter-wave radar 13c having a detection range behind the vehicle A. The sonars 14a, 14b, and 14c generate detection information of the surrounding environment by receiving reflected ultrasonic waves. The sonars 14a, 14b, 14c include a front sonar 14a, side A sonar 14b, and a rear sonar 14c each having a corresponding detection range, similar to the millimeter wave radars 13a, 13b, 13c. Note that the millimeter wave radar and sonar may each be capable of detecting a wider range covering the above-described detection ranges.

Each environment monitoring sensor 10 sequentially outputs generated detection information to the automated-driving ECU 50. By analyzing the detection information, each environment monitoring sensor 10 recognizes the presence and position of an obstacle on a traveling route and other vehicles such as a preceding vehicle, a parallelly-traveling vehicle, and an oncoming vehicle.

The vehicle state sensor 20 is a sensor group for detecting various states of the vehicle A. The vehicle state sensor 20 includes, for example, a vehicle speed sensor 21, an acceleration sensor 22, a gyro sensor 23, and a shift position sensor 24. The vehicle speed sensor 21 detects a traveling speed of vehicle A. The acceleration sensor 22 detects acceleration acting on the vehicle A. The gyro sensor 23 detects an angular velocity acting on the vehicle A. The shift position sensor 24 detects the position of the shift lever of the vehicle A. The vehicle state sensor may include a GNSS (Global Navigation Satellite System) receiver or the like that detects positioning signals from positioning satellites.

The in-vehicle communication device 30 is a communication module mounted in the vehicle A. The in-vehicle communication device 30 has at least a V2N (Vehicle to cellular Network) communication function in line with communication standards such as LTE (Long Term Evolution) and 5G, and sends and receives radio waves to and from base stations around the vehicle A. The in-vehicle communication device 30 can communicate with the server device 100 of the center via the base station by V2N communication. The in-vehicle communication device 30 may further have functions such as road-to-vehicle (Vehicle to roadside Infrastructure) communication and inter-vehicle (Vehicle to Vehicle) communication. The in-vehicle communication device 30 enables cooperation between a cloud system and an in-vehicle system (Cloud to Car) by V2N communication. By mounting the in-vehicle communication device 30, the vehicle A as a connected car is able to connect to the Internet.

The HCU 40 is one component of a HMI (Human Machine Interface) system 4. The HMI system 4 is a system for presenting information to vehicle occupants, and includes a display device 41, an audio device 42, and an operation input unit 43 as components in addition to the HCU 40. The display device 41 is an in-vehicle display device mounted in the vehicle A. The display device 41 is, for example, a head-up display configured to project a virtual image onto a floodlight member, a meter display provided in the meter, or a CID (Center Information Display) provided in the center of the instrument panel. The audio device 42 is an audio output device such as a speaker mounted in the vehicle A. The operation input unit 43 is a device that receives an operation input from an occupant. The operation input unit 43 includes, for example, a touch panel installed on a display such as a CID, physical switches installed on a center console, a steering handle, and the like.

The HCU 40 mainly includes a microcomputer equipped with a processor, a memory, an input/output interface, and a bus connecting these elements. The HCU 40 is electrically connected to the various devices described above and the automated-driving ECU 50. The HCU 40 sequentially generates and outputs data to be presented to each device based on the data acquired from the automated-driving ECU 50. Accordingly, the HCU 40 appropriately presents information to occupants including the driver.

The vehicle control ECU 60 is an electronic control unit that performs acceleration and deceleration control and steering control of the vehicle A. The vehicle control ECU 60 includes an accelerator ECU 60*a* that performs acceleration control, a brake ECU 60*b* that performs deceleration control, a steering ECU 60*c* that performs steering control, and the like. The vehicle control ECU 60 acquires detection signals output from respective sensors such as the steering angle sensor, the vehicle speed sensor, and the like mounted in the vehicle A, and outputs a control signal to an electronic control throttle, a brake actuator, an EPS (Electronic Power Steering) motor, and the like. The vehicle control ECU 60 acquires a travel trajectory of the vehicle A during automated-driving from the automated-driving ECU 50, and controls each travel control device so as to realize driving assistance or autonomous traveling according to the travel trajectory.

The automated-driving ECU 50 executes an advanced driving assistance function or an autonomous driving function based on information from the environment monitoring sensor 10 and the vehicle state sensor 20 as described above. The automated-driving ECU 50 mainly includes a memory 51, a processor 52, an input/output interface, a bus connecting these components, and the like. The processor 52 is a hardware for arithmetic processing. The processor 52 includes, as a core, at least one type of, for example, a CPU (Central Processing Unit), a GPU (Graphics Processing Unit), an RISC (Reduced Instruction Set Computer) CPU, and so on.

The memory 51 is, for example, at least one type of non-transitory, tangible, storage medium, such as a semiconductor memory, a magnetic storage medium, and an optical storage medium, for non-transitory storing or memorizing computer readable programs and data. The memory 51 stores various programs executed by the processor 102, such as a automated-driving control program which will be described later. In addition, the memory 51 stores a vehicle map database (hereinafter, referred to as "DB") 53.

The vehicle map DB 33 stores map data such as link data, node data, road shape, structures and the like. For example, the vehicle map DB 53 stores features such as road markings as data formed of a plurality of nodes including position information and a plurality of links including connection information between the nodes. The map data may include a three-dimensional map including point groups of feature points of features, road shapes, and buildings. The three-dimensional map may be generated based on a captured image by REM (Road Experience Management, REM is a registered trademark).

The map data includes information on virtual lane lines VC that serve as guidelines for traffic at the intersection I. The virtual lane line VC according to the first embodiment defines an area where the vehicle A travels during automated-driving at the intersection I which is a road area without lane markings. The information of the virtual lane line VC is distributed from the server device 100 of the center DC. The details of the virtual lane lines VC will be described later.

Figure 3:
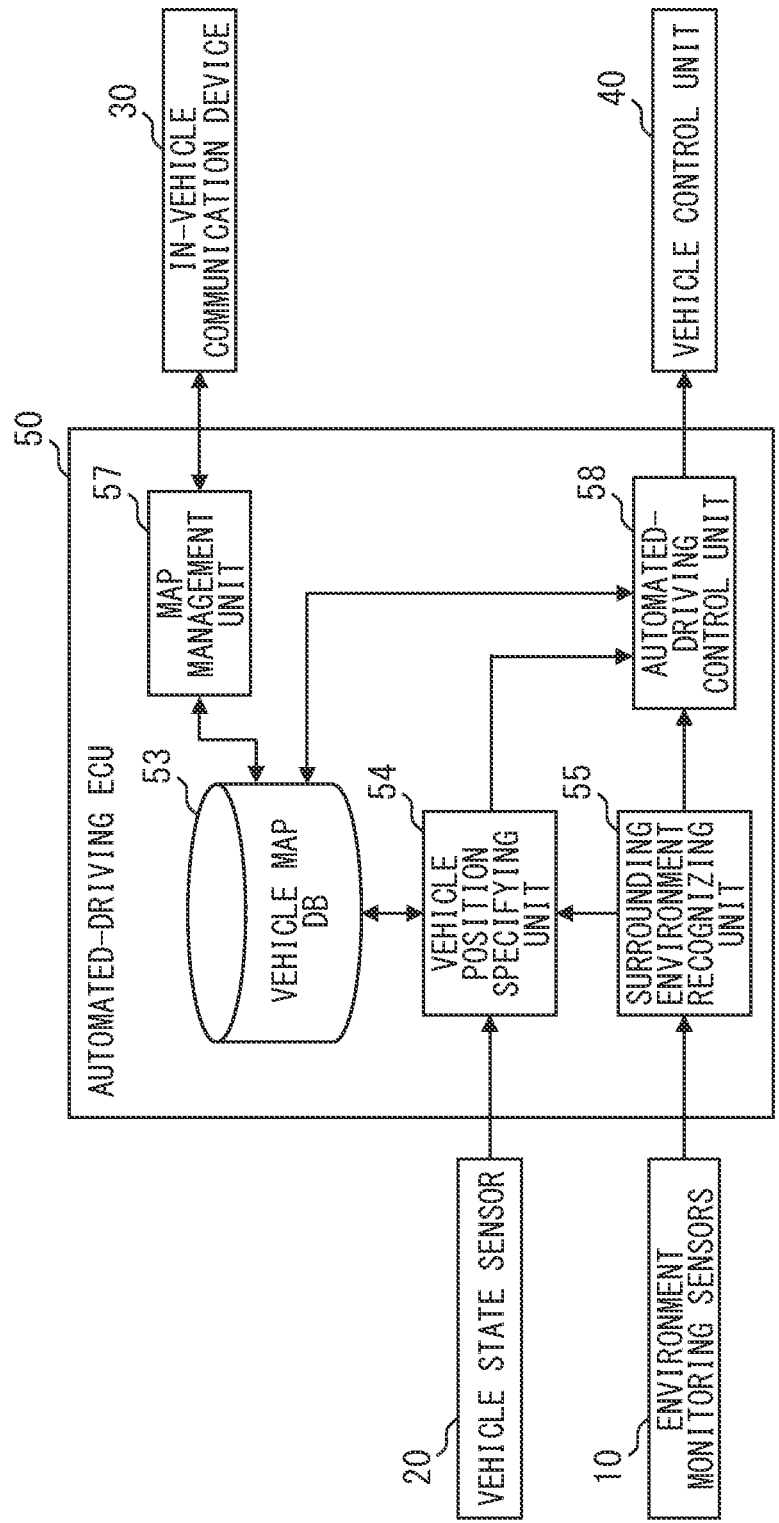
FIG. 3 is a block diagram showing one example of an automated-driving ECU.

The processor 52 executes multiple instructions included in the automated-driving control program stored in the memory 51. Thereby, the automated-driving ECU provides a plurality of functional units for executing the advanced-driving assistance function or the automated-driving function. Specifically, as shown in FIG. 3, the automated-driving ECU includes functional units such as a vehicle position specifying unit 54, a surrounding environment recognizing unit 55, a map management unit 57, and an automated-driving control unit 58.

The vehicle position specifying unit 54 specifies the position of the vehicle A based on information detected by the vehicle state sensor 20. The vehicle position specifying unit 54 may specify the position by dead reckoning which is also called autonomous navigation. Alternatively, if the vehicle state sensor 20 includes a GNSS receiver, the vehicle position identifying unit 54 may specify its position based on the positioning signals.

The surrounding environment recognizing unit 55 recognizes an environment surrounding the vehicle A based on the detection information. Specifically, the surrounding environment recognizing unit 55 recognizes existence of obstacles on the traveling route and other vehicles such as preceding vehicles, parallelly-traveling vehicles, and oncoming vehicles, and positions thereof. In addition, the surrounding environment recognizing unit 55 recognizes the shape, type, and position of features on the road. The features on the road may include, for example, lane markings (center lines, lane boundaries, etc.), road markings such as stop lines and indicators to turn left/right, road signs, and traffic lights.

The map management unit 57 manages map data stored in the vehicle map DB 53. Specifically, the map management unit 57 downloads the latest map data through communication with the center DC via the in-vehicle communication device 30 and then updates the map DB 53.

The map management unit 57 may also generate update information for map data based on the surrounding environment recognized by the surrounding environment recognizing unit 55. The map management unit 57 timely uploads the update information to the center DC via the in-vehicle communication device 30.

The automated-driving control unit 58 carries out driving control of the vehicle A based on its position, surrounding environment, map data, and the like. More specifically, the automated-driving control unit 58 determines an action to be taken by the vehicle A, such as going straight, stopping, changing lanes, turning right or left, etc., based on each information, and successively generates a traveling trajectory according to the action for each predetermined section. The traveling trajectory defines traveling positions of the vehicle A and a traveling speed at each of the traveling positions. The automated-driving control unit 58 generates a traveling trajectory based on travel lane lines in an area where the travel lane lines exist. In addition, the automated-driving control unit 58 implements the travel trajectory based on the information of virtual lane lines VC included in the map data at the intersection I which is the section without travel lane lines. For example, the automated-driving control unit 58 determines the shape of the travel trajectory so that the vehicle does not cross over (i.e., protrude) the virtual lane lines VC. The automated-driving control unit 58 performs automated-driving along the traveling trajectory by outputting the generated travel trajectory to the vehicle control ECU 60.

Figure 4:
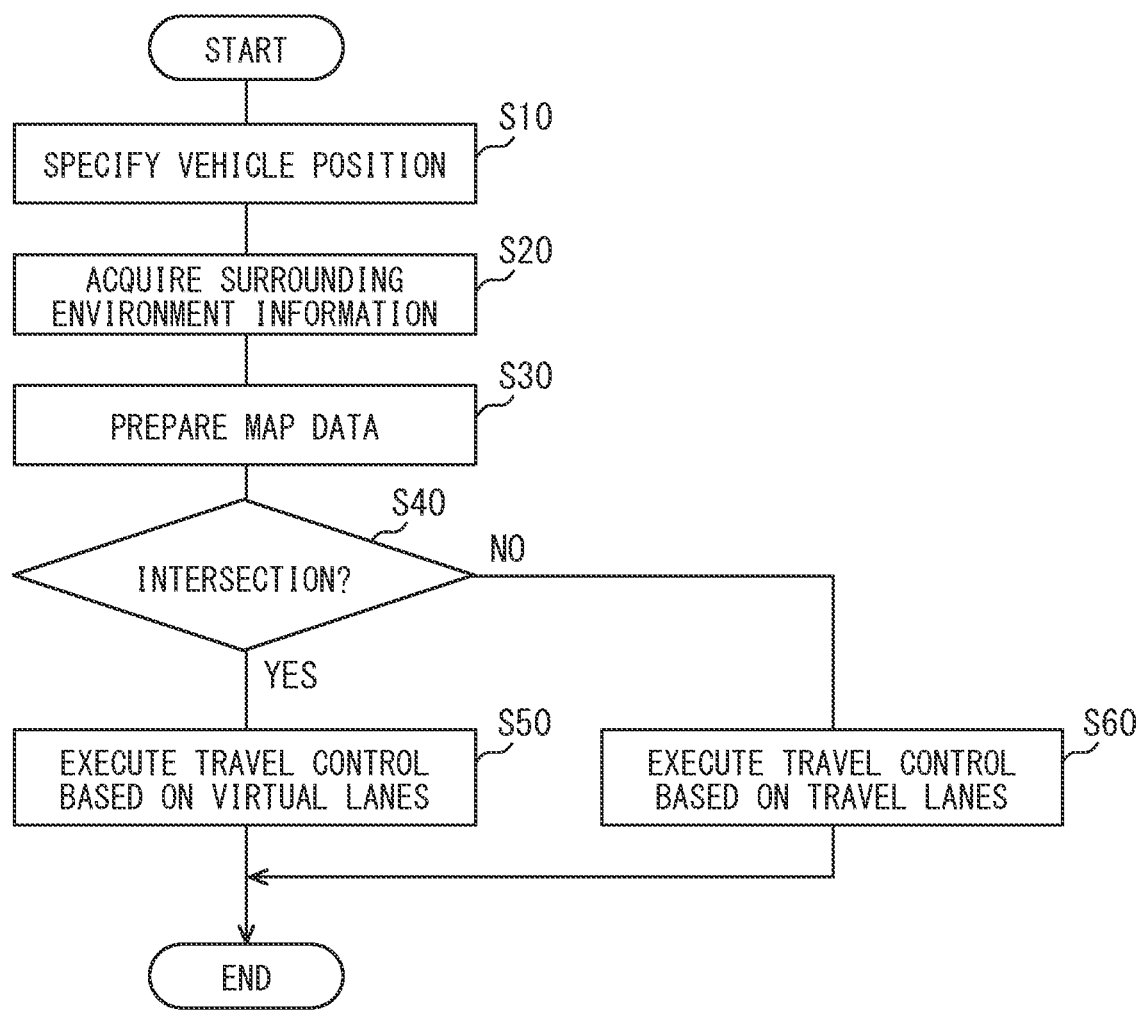
FIG. 4 is a flowchart showing one example of an automated-driving control method executed by the automated-driving ECU.

The automated-driving process performed by the automated-driving ECU 50 will be described below with reference to FIG. 4. At S10, the vehicle position specifying unit 54 specifies the position of the vehicle A based on information detected by the vehicle state sensor 20. At S20, the surrounding environment recognizing unit 55 recognizes an environment surrounding the vehicle A based on the detection information from the surrounding monitoring sensor 10. At S30, the automated-driving control unit 58 reads map data from the map DB 53.

At S40, the automated-driving control unit 58 determines whether the section of the generated travel trajectory is an intersection. If the generated section is determined to be an intersection, the process proceeds to S50. At S50, the automated-driving control unit 58 performs a traveling control by generating a travel trajectory based on the virtual lane lines VC. On the contrary, if the generated section is not determined to be an intersection, the process proceeds to S60. At S60, the automated-driving control unit 58 performs a traveling control by generating a travel trajectory based on the travel lane lines of the map data.

Next, the configuration of the center DC will be described below.

The center DC includes a communication device 90 and a server device 100. The communication device 90 is a communication device electrically connected to the server device 100, and enables communication between the center DC and vehicle A via network NW.

The server device 100 mainly includes a memory 101, a processor 102, an input/output interface, and a bus connecting these components. The processor 102 is hardware for arithmetic processing. The processor 102 includes, as a core, at least one type of, for example, a CPU (Central Processing Unit), a GPU (Graphics Processing Unit), an RISC (Reduced Instruction Set Computer) CPU, and so on.

The memory 101 is at least one type of non-transitory tangible storage medium, such as a semiconductor memory, a magnetic storage medium, and an optical storage medium, for non-transitory storing or memorizing computer readable programs and data. The memory 101 stores various programs executed by the processor 102, such as a map data generation program which will be described later. The memory 101 also stores a server map DB 105.

The server map DB 105 stores distribution source data of the map data stored in the vehicle map DB 53. The server map DB 105 comprehensively includes map data of a wider area than the map data of the vehicle map DB 53. The server map DB 105 stores features such as road markings as data formed of a plurality of nodes including position information and a plurality of links including connection information between the nodes. In addition, the map data includes traffic control information by traffic lights installed at each intersection I. Note that the map data may be appropriately updated based on detection data transmitted from the vehicle A.

Figure 5:
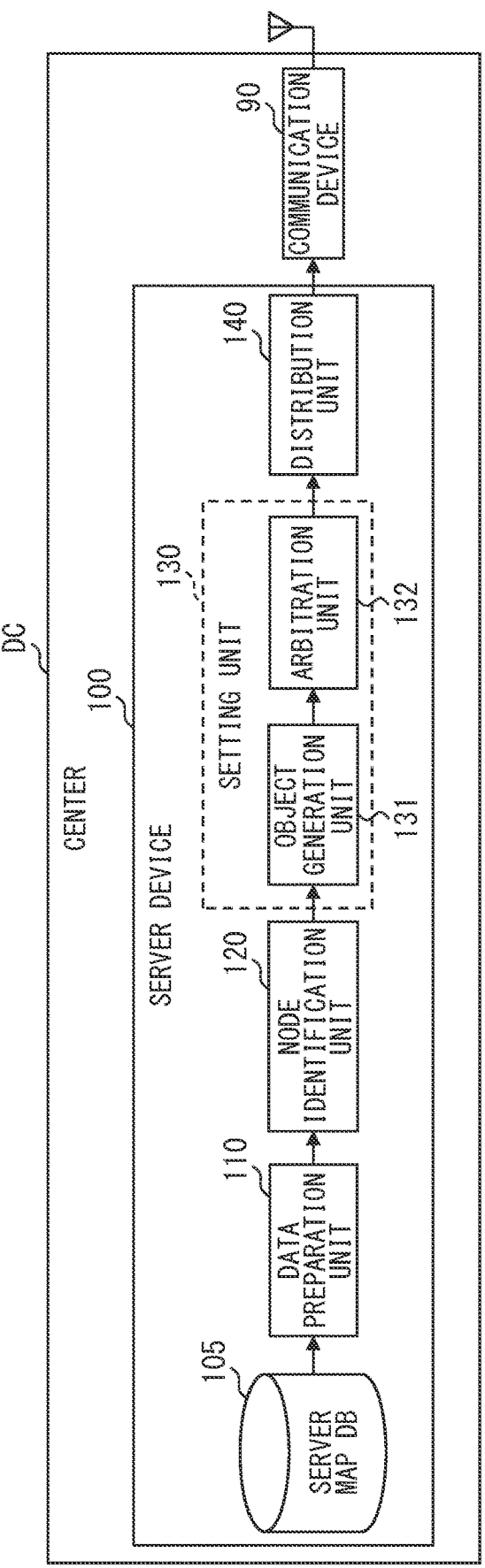
FIG. 5 is a block diagram showing one example of functions of the server device.

The processor 102 executes multiple instructions included in the map data generation program stored in the memory 101. Accordingly, the server device 100 provides a plurality of functional units. As described above, in the server device 100, the program stored in the memory 101 causes the processor 102 to execute the multiple instructions, thereby constitutes functional units. Specifically, the functional units such as a map data preparation unit 110, a node identification unit 120, and a setting unit 130 are established in the server device 100, as shown in FIG. 5.

The data preparation unit 110 prepares the map data by reading the map data from the server map DB 105.

The node identification unit 120 identifies, for each intersection I included in the map data, a combination between an entry node Na and an exit node Ne corresponding to the entry node Na. Each of the nodes Na and Ne is positional information indicating an end point of the lane at which the lane is connected to the intersection I. The nodes Na and Ne are, for example, nodes indicating the intersection side end points of the left and right lanes included in the map data.

Figure 6:
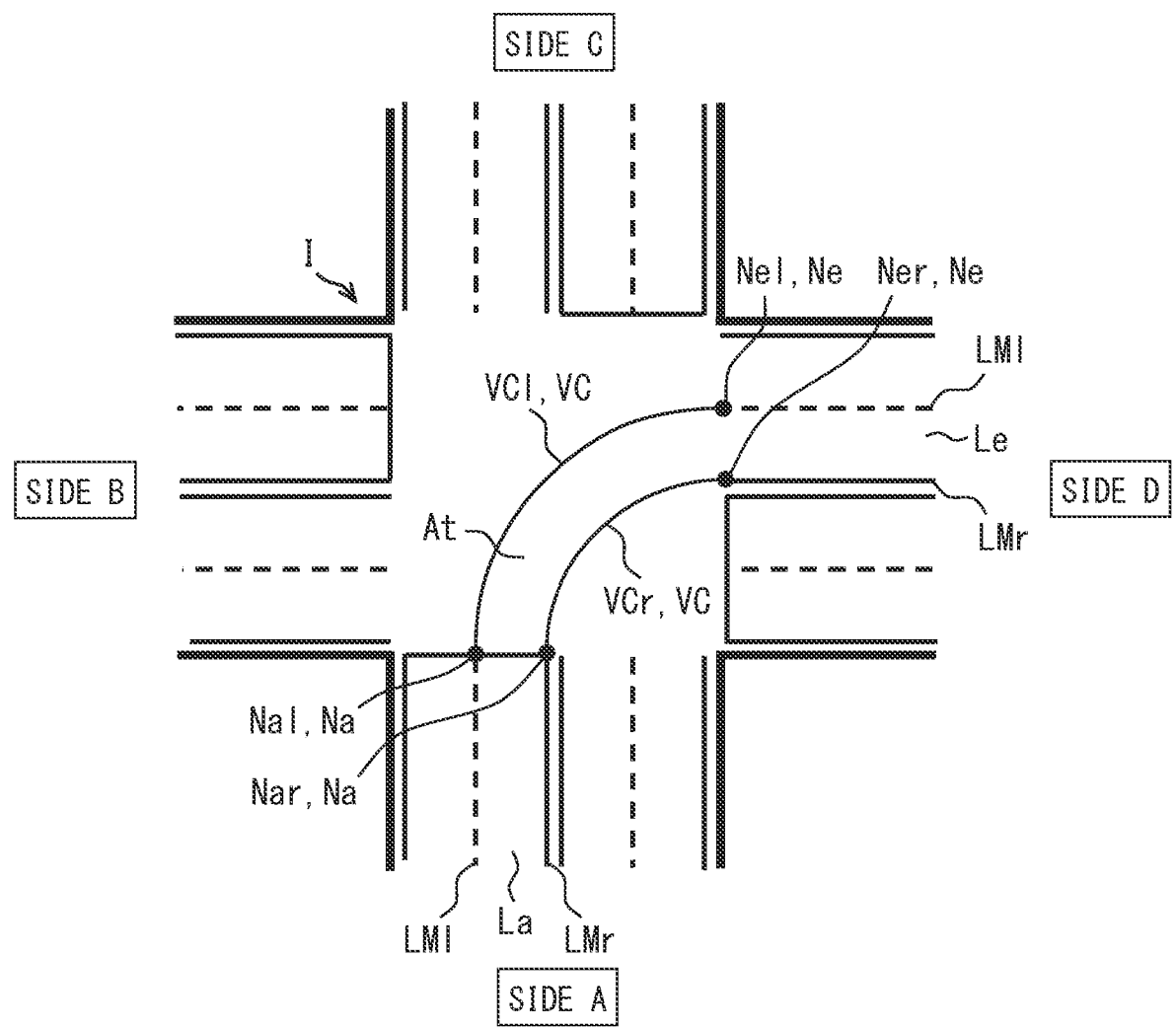
FIG. 6 is a diagram showing one example of specifying an entry node and an exit node and generating virtual lane lines.

A combination of the nodes Na and Ne will be described with an exemplary situation where an intersection I is formed between roads with four lanes on both sides (i.e., two lanes on one side) as shown in FIG. 6 as an example. At the intersection I in FIG. 6, it is assumed that the right lane in the road along the travel direction is a dedicated right-turn lane, and the left lane in the road along the travel direction is a left-turn and straight lane.

In FIG. 6, it is assumed that the right lane in the road along the travel direction among the two lanes entering the intersection I from side A is an entry lane La of interest. In this case, the end nodes of each of the left-side and right-side travel lane lines LML and LMr of the entry lane La are the entry nodes Na. Note that the entry lane La of interest in FIG. 6 is assumed to be a dedicated right-turn lane. In the following description, the right-side entry node Na may be referred to as an entry node Nar, and the left-side entry node Na may be referred to as an entry node Nal for distinction purposes.

The exit nodes Ne are end nodes of a lane assumed as the exit lane Le from the entry lane La of interest. The node identification unit 120 identifies all reachable exit nodes Ne for a specific entry node Na based on information on a travelable direction of the corresponding entry lane La and traffic rules. In the example shown in FIG. 6, among the two lanes exiting toward side D, the right side lane in the travel direction is the exit lane Le from the entry lane La of interest. Then, end nodes of the exit lane Le are the exit nodes Ne. Hereinafter, for the purpose of distinction, the exit node Ne on the right side in the travel direction may be referred to as an exit node Ner, and the exit node Ne on the left side may be referred to as an exit node Nel.

The node identification unit 120 identifies, for each intersection I, combinations of all assumed entry nodes Na and all assumed exit nodes Ne corresponding to the entry nodes Na.

Figure 7:
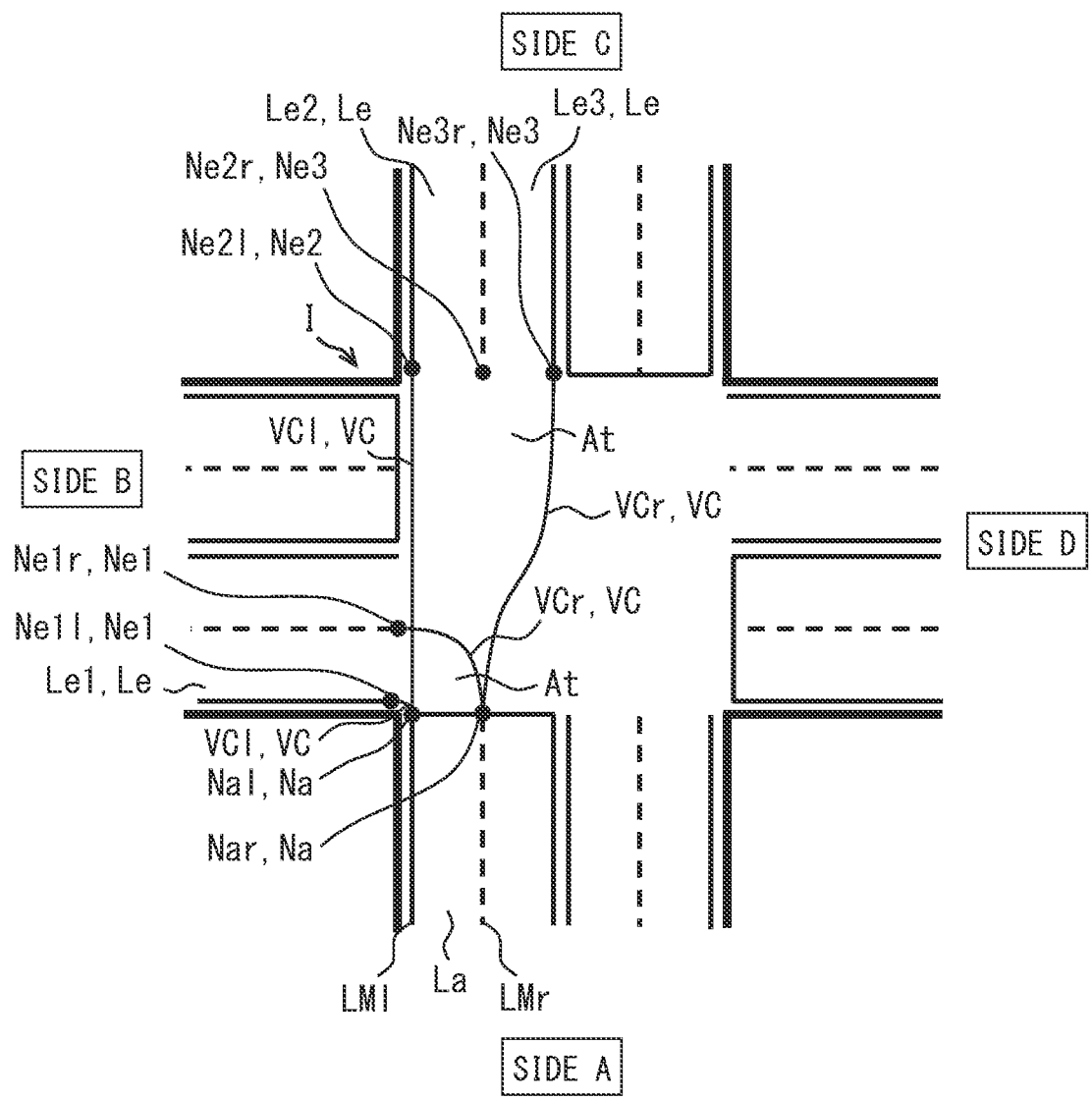
FIG. 7 is a diagram showing one example of specifying the entry node and the exit node and generating the virtual lane lines.

It is also assumed that the node identification unit 120 identifies the edge node in the left lane as the entry nodes Na, as shown in FIG. 7. Since this lane is a left-turn and straight-ahead lane, the node identification unit 120 identifies the end node in the left-turn exit lane as an exit node Ne1. In addition, the node identification unit 120 identifies end nodes of the straight exit lane as exit nodes Ne2 and Ne3, respectively. Thereby, the node identification unit 120 identifies a set of the entry node Na and the exit node Ne1, a set of the entry node Na and the exit node Ne2, and a set of the entry node Na and the exit node Ne3. The node identification unit 120 similarly identifies a combination of an entry node Na and a corresponding exit node Ne for another assumed entry lane.

The setting unit 130 executes an setting process of the virtual lane lines VC at the intersection I based on the specified entry nodes and exit nodes. The setting unit 130 has a generation unit 131 and an arbitration unit 132 as sub-function units.

The generation unit 131 generates virtual lane lines VC that connects between the specified entry nodes Na and exit nodes Ne. The generation unit 131 sets the virtual lane lines VC in accordance with the number corresponding to the specified combination of the entry nodes Na and the exit nodes Ne. The virtual lane line VC is an example of a virtual connection object that serves as a reference (or a guidance) for the vehicle A to travel. In the first embodiment, the virtual lane lines VC define a travelable area At within which the vehicle A is allowed to travel when the vehicle A is automatically traveling by the advanced driving assistance function or the automated-driving function.

As shown in FIG. 6 and the like, the virtual lane lines VC include a right-side virtual lane line VCr connecting the entry node Nar and the exit node Ner on the right side in the travel direction, and a left-side virtual lane line VCr connecting the entry node Nal and the exit node Nel on the left side in the travel direction. An area defined between the virtual lane lines VCr and VLl in the intersection I is the travelable area At. The generation unit may generate the virtual lane line VC as a spline curve with the entry node Na as the starting point and the exit node Ne as the end point. Note that, for a combination of nodes within which the vehicle A is allowed to travel substantially linearly, the generation unit 131 may generate a virtual lane line VC as a straight line connecting the nodes.

Here, if a plurality of exit lanes Le corresponding to one entry lane La exist adjacently, the generation unit 131 does not connect the virtual lane lines VC to each of the plurality of exit lanes Le, but connect the virtual lane lines VC to an area collectively including the plurality of the exit lanes Le.

As an example, at an intersection I shown in FIG. 7, adjacent exit lanes Le2 and Le3 exist in side C. In this case, the generation unit 131 connects the entry node Nal and the exit node Ne2l in the exit lane Le2 on the left side in the travel direction by the left-side virtual lane line VCl. Further, the generation unit 131 connects the entry node Nar and the exit node Ne3r in the exit lane Le3 on the right side in the travel direction by the right-side virtual lane line VCr. The generation unit generates the virtual lane line VC formed of the pair of virtual lane lines VCl and VCr as an object that defines the travelable area At connecting the two exit lanes Le2 and Le3.

The arbitration unit 132 adjusts the shape of the virtual lane lines VC so as not to cross the virtual lane lines VC, among the plurality of virtual lane lines VCs, that define the travelable area At in which simultaneous traffic may occur. In other words, the arbitration unit 132 sets, regarding combinations of the travelable areas At in which simultaneous traffic by vehicles may occur, the virtual lane lines VC corresponding to these areas At so as to prohibit partial crossing from occurring, that is, overlapping of some areas of the virtual lane lines VC. Crossing of virtual lane lines VC in which multiple vehicles A may travel simultaneously is an example of an "avoidance condition." In other words, the relationship between two sets of the virtual lane lines VC connected between mutually different entry nodes Na and mutually different exit nodes Ne is a relationship where partial overlapping of the virtual lane lines VC is prohibited as to a combination where multiple vehicles may travel simultaneously according to traffic rules.

However, the arbitration unit 132 permits crossing of a combination of virtual lane lines VC if crossing is unavoidable. More specifically, the arbitration unit 132 allows for crossing of virtual lane lines VC if an entry node Na and an exit node Ne corresponding to one virtual lane line VC are positioned on both sides of the other virtual lane line VC in an intersection I. As a result, the combinations of virtual lane lines VC in which partial overlap is prohibited excludes the combination of virtual lane lines VC in which crossing is physically unavoidable.

Figure 8:
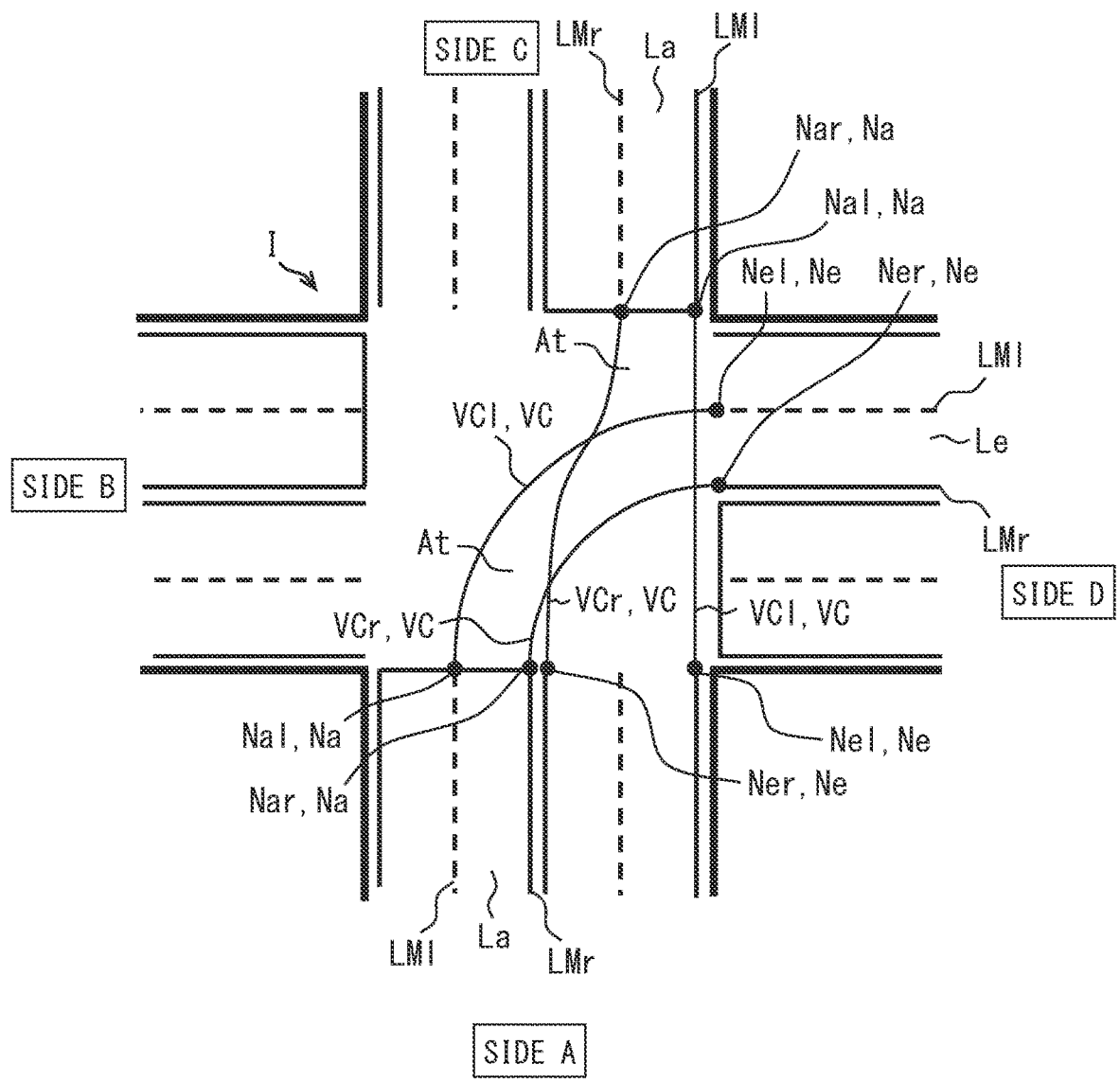
FIG. 8 is a diagram showing one example of a combination of virtual lane lines where crossing thereof is unavoidable.

As an example, as shown in FIG. 8, the virtual lane line VC connecting a dedicated right-turn entry lane La in side A and an exit lane Le in D side is allowed to cross the virtual lane line VC connecting a straight-ahead entry lane La in side C and an exit lane in side A since it is impossible for the vehicle to travel without crossing.

Note that the arbitration unit 132 also permits crossing of a combination of virtual lane lines VCs that share the entry node Na, as a combination where crossing is unavoidable. In the example shown in FIG. 7, crossing between the virtual lane line VC connecting the entry node Na in side A and the exit node Net of the exit lane Le1 in side B and the virtual lane line VC connecting the entry node Na and the exit nodes Ne2l, Ne3r of the exit lanes Le2, Le3 in side C is allowed.

The arbitration unit 132 extracts combinations of crossing virtual lane lines VCs, excluding the above-described combinations, and determines whether crossing of the combinations is allowed. The arbitration unit 132 performs arbitration for avoiding crossing regarding combinations for which crossing is not determined to be allowed. In the first embodiment, the process of avoiding crossing corresponds to a "resolving the avoidance condition".

As an example, the arbitration unit 132 extracts combination patterns of crossing virtual lane lines VC as candidate patterns in which simultaneous traffic may occur. Then, the arbitration unit 132 identifies combinations, among the candidate combination patterns, for which crossing is actually prohibited based on traffic control information of traffic lights. The traffic control information is information for determining entry permission timings for vehicles from each entry lane La at the intersection I. For example, the traffic control information includes information indicative of presence/absence of a traffic light, the type of the signal light including presence/absence of an arrow light, a timing of lighting each signal light, and the like. The traffic control information is included in the map data. Alternatively, the traffic control information may be acquired from a roadside device installed on the roadside. For each virtual lane line VC of the candidate pattern, the arbitration unit 132 prohibits crossing of the virtual lane lines VC when the entry permission timings overlap with each other, and permits crossing of the virtual lane lines VC when the entry permission timings do not overlap with each other.

Figure 9:
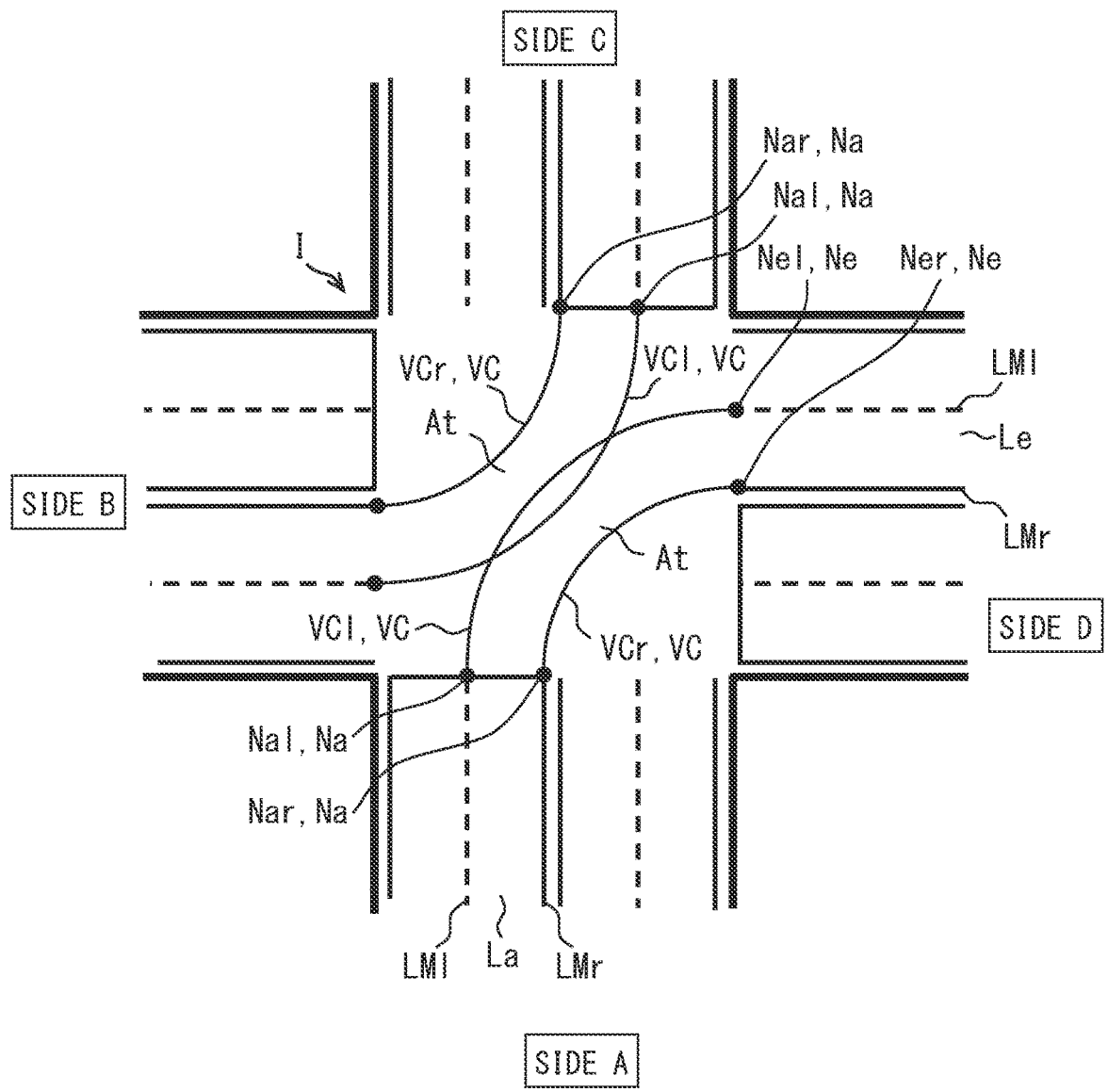
FIG. 9 is a diagram showing one example of a combination of virtual lane lines for which crossing is prohibited.

Next, a specific example of the candidate patterns will be described below. As shown in FIG. 9, an example of the candidate pattern is a combination of the virtual lane lines VC (an opposing right-turning combination) which serve as guides for right-turning traffic in opposing sides. Hereinafter, for each of sides in which the roads connecting to the intersection I extend, a specific side is defined as A side, an opposite side opposite to the specific side is defined as C side, a right turn side with respect to the specific side is defined as D side, and a right turn side with respect to the opposite side is defined as side B. Here, the virtual lane line VC extending from the entry lane La in the side A to the exit lane Le in the side D, and the virtual lane line VC extending from the entry lane La in the side C to the exit lane Le in the side B are a combination as one of the candidate patterns. In the example shown in FIG. 9, the left-side virtual lane lines VCl of the virtual lane lines VC intersect with each other and the travelable areas At overlap with each other.

Here, "right turn" may also mean turning around in a direction to cross the straight route extending from the opposite side to the specific side. Note that this description is based on a situation where it departs from the specific side, and if departing from the opposite side, "turning right" means turning around in a direction to cross the straight route extending from the specific side to the opposite side.

With respect to the above combination, the arbitration unit 132 determines that the entry permission timings overlap with each other when no traffic light exists at the intersection I, when no arrow light permitting a right turn (right-turn arrow light), or when the timings of lighting the right-turn arrow lights overlap with each other. In this case, the arbitration unit 132 prohibits crossing of the virtual lane lines VC.

Figure 10:
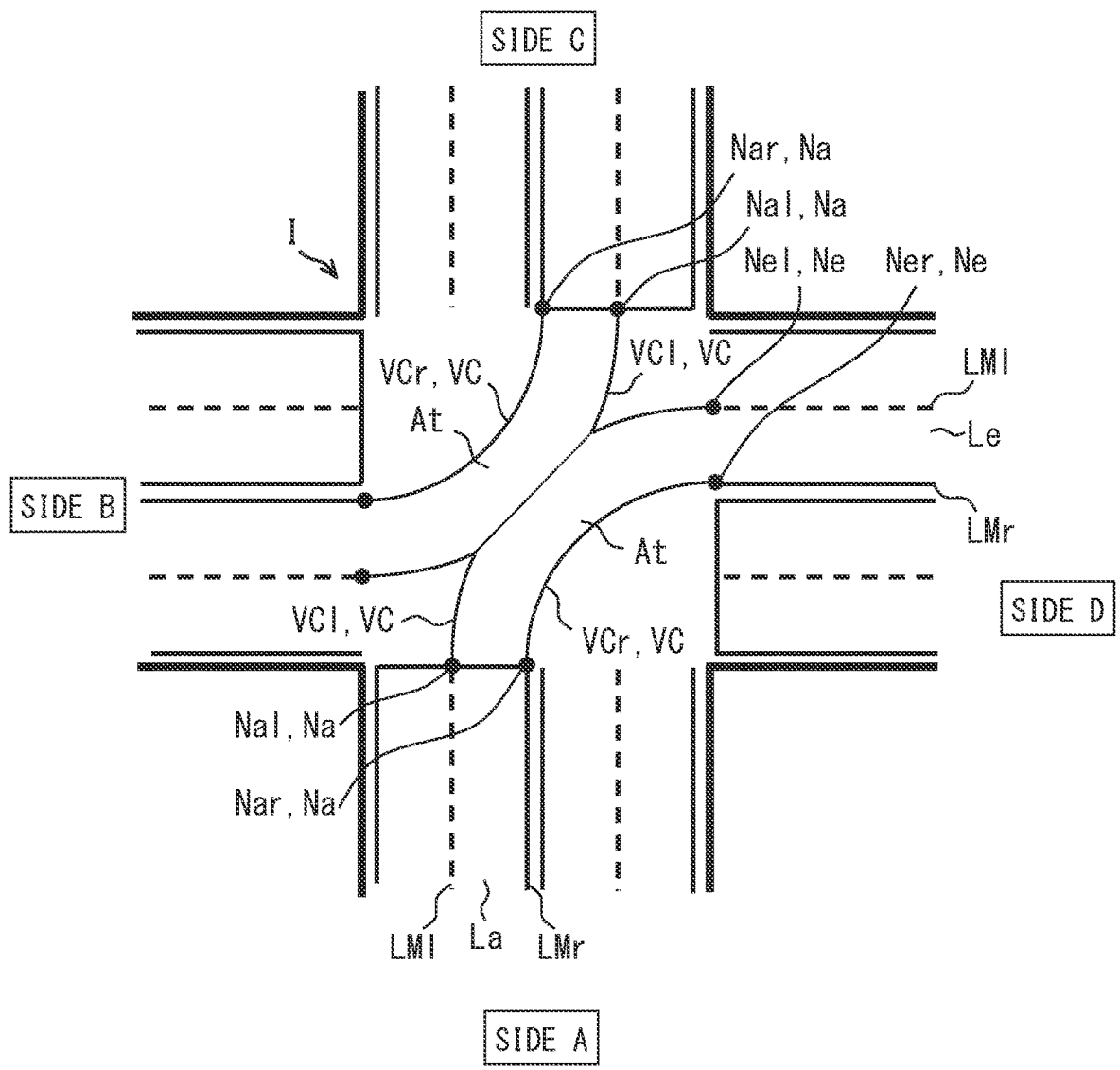
FIG. 10 is a diagram showing an example of arbitration of virtual lane lines in FIG. 9.

In this case, as shown in FIG. 10, the arbitration unit 132 makes arbitration such that, a line connecting crossing points between the left-side virtual lines VCl crossing each other in each of the pre-arbitrated virtual lane lines VC is treated as a part of each of new left-side virtual lines VCl. As a result, a part of each left virtual line VCl is shared.

Figure 11:
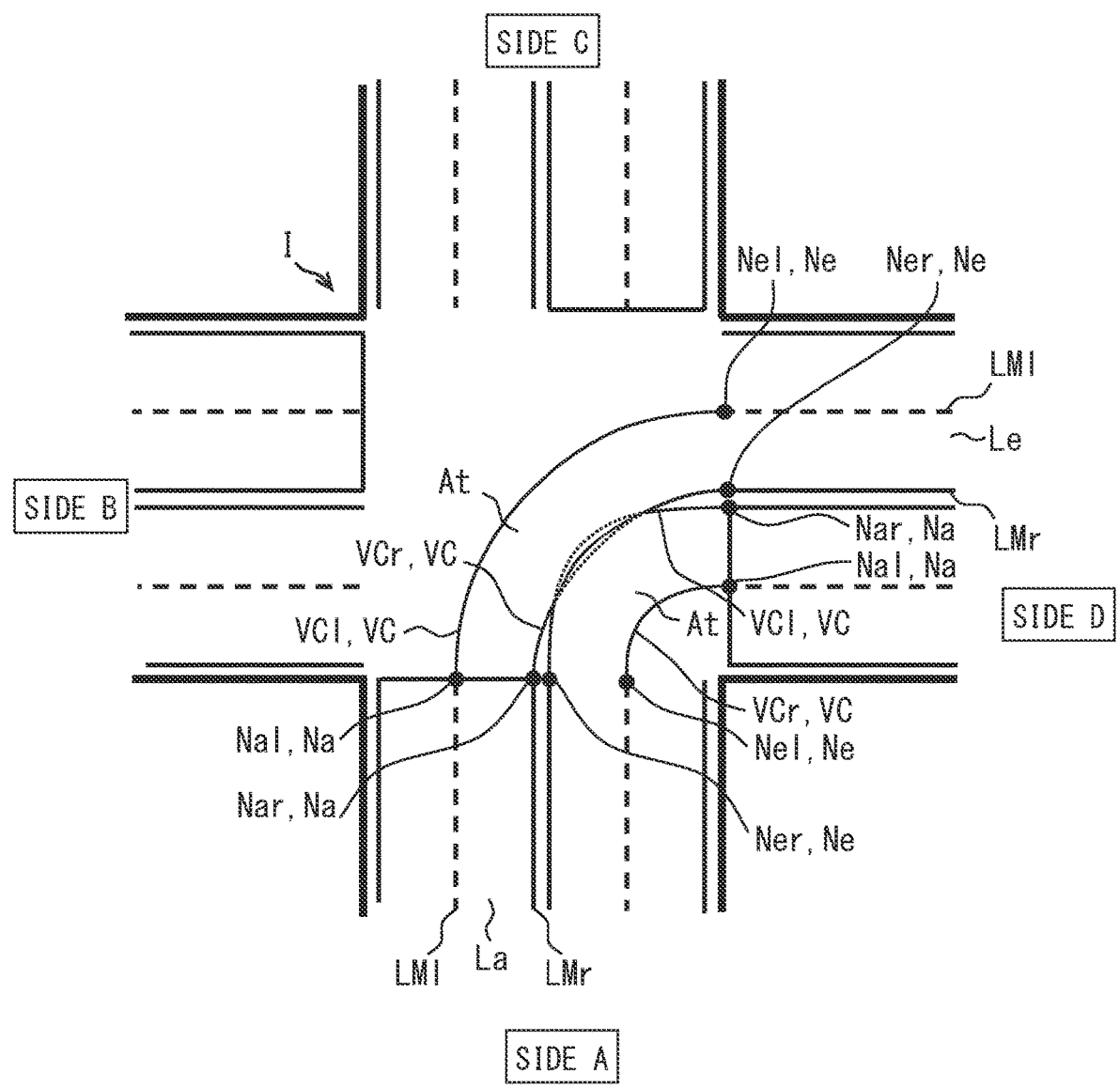
FIG. 11 is a diagram showing one example of a combination of virtual lane lines for which crossing is prohibited.
Figure 12:
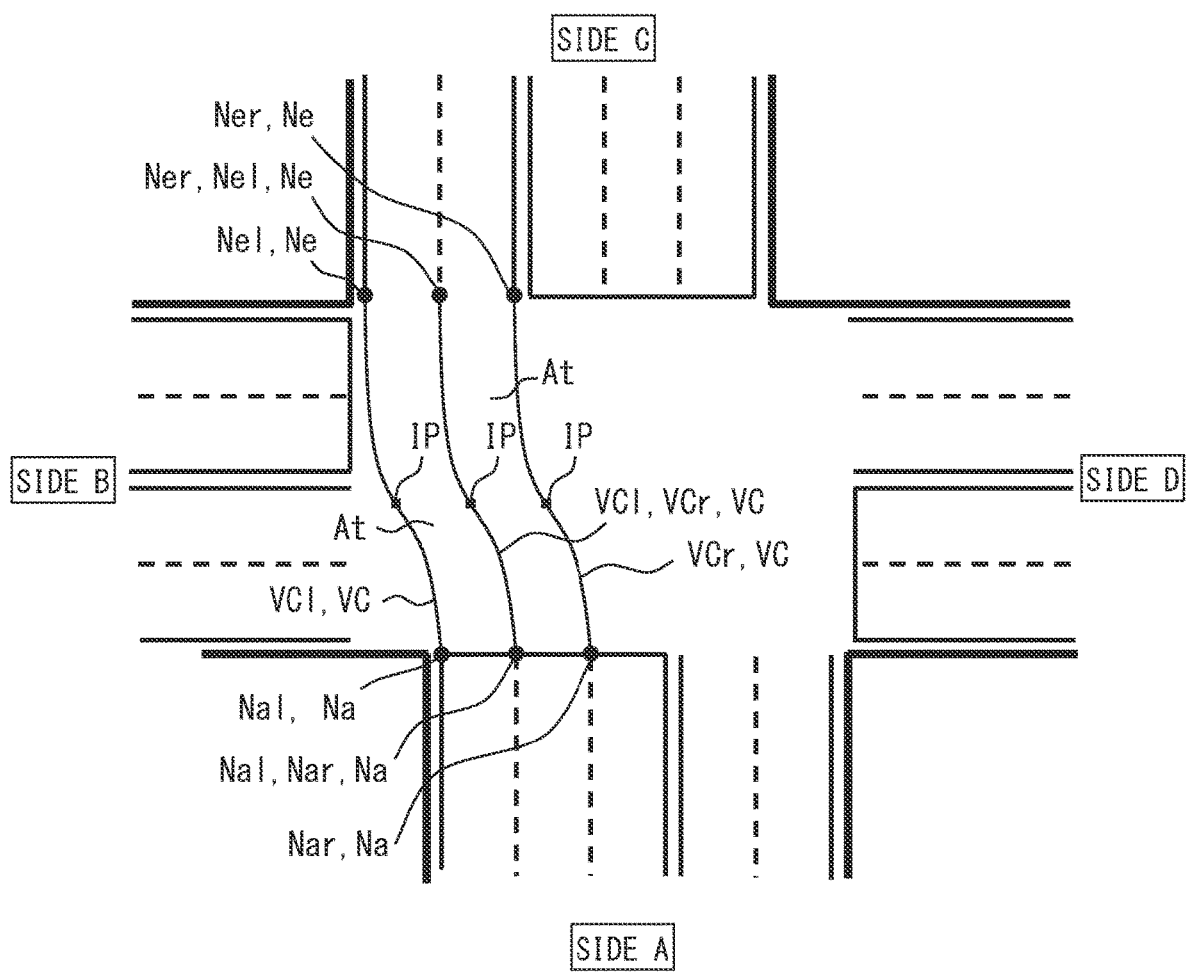
FIG. 12 is a diagram showing one example of a combination of virtual lane lines for which crossing is prohibited.
Figure 13:
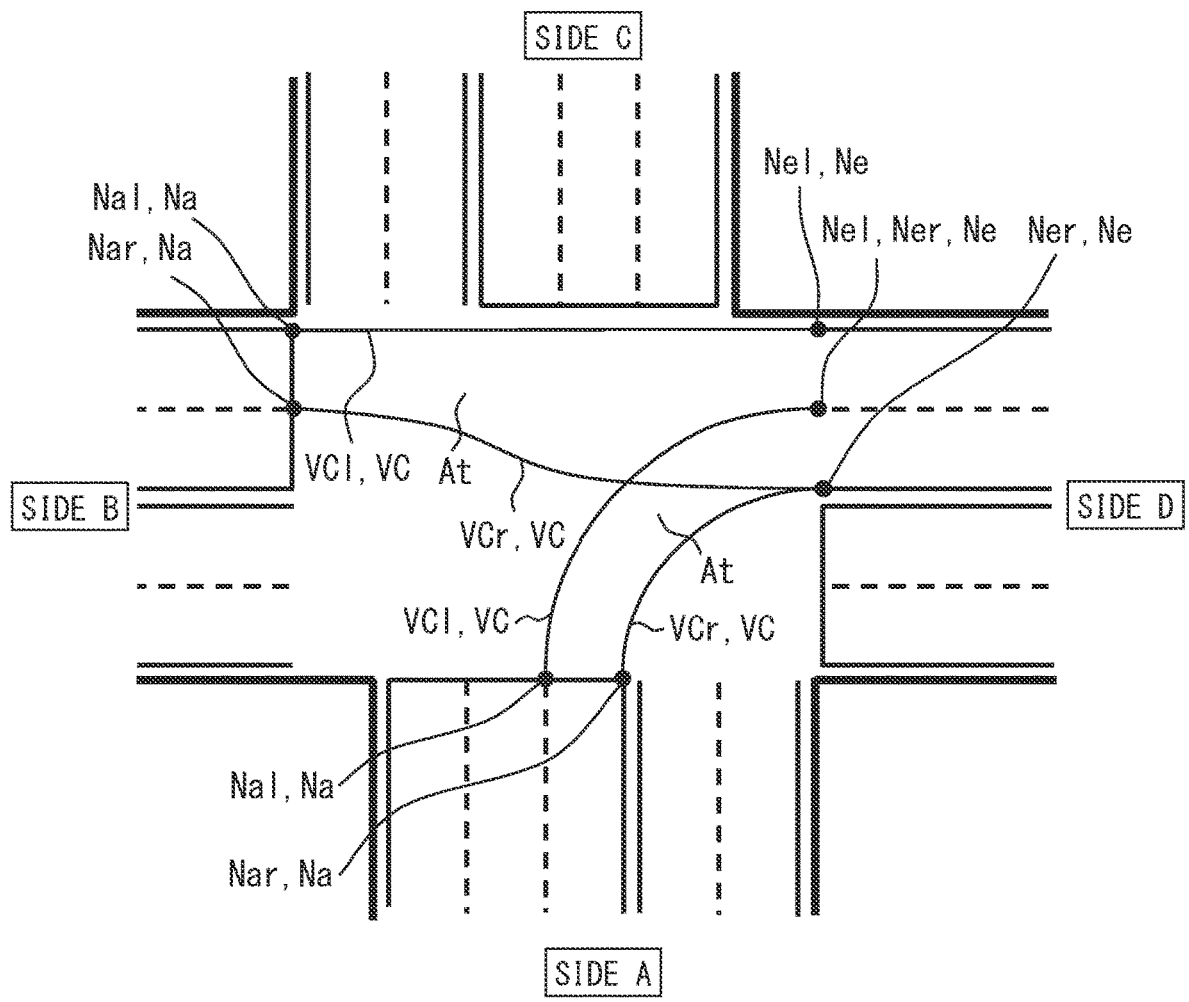
FIG. 13 is a diagram showing one example of a combination of virtual lane lines for which crossing is prohibited.

Another example of the candidate pattern is, as shown in FIG. 11, a combination (first combination) of a travelable area At connected from the entry lane La in the specific side to the exit lane Le in the right side and a travelable area At connected from the entry lane La in the right side to the exist lane Le in the specific side.

Regarding the above combination, if no traffic light exists at the intersection I, or if the right turn permission timing from the side A to the side D and the left turn permission timing from the side D to the side A overlap with each other, the entry permission timings are determined to overlap with each other. In this case, the arbitration unit 132 prohibits crossing of the virtual lane lines VC.

In this case, the arbitration unit 132 makes arbitration such that a line connecting crossing points between the right-side virtual lines VCr crossing each other in each of the pre-arbitrated virtual lane lines VC is treated as a part of each of new right virtual lines VCr. As a result, a part of each right virtual line VCr is shared.

Yet another example of the candidate pattern is a combination of adjacent virtual lane lines VC connected from different entry lanes La in the specific side to different exit lanes Le in the same opposing side. This combination can also be rephrased as a combination of virtual lane lines VC along which vehicles A travel side by side from the specific side to the same opposing side when the two vehicles travel at the same time. In the example shown in FIG. 12, the virtual lane line VC connected from the center entry lane La in the side A to the right-side exit lane Le in the C side and the virtual lane line VC connected from the left-side entry lane La in the A side to the left-side exit lane Le in the side C form a combination. Note in the intersection I shown in FIG. 12, the entry lane in the side A and the exit lane Le in the C side are offset from each other in a road width direction.

Regarding the above combination, if no traffic light exists at the intersection I, or if the straight-ahead permission timing of the center entry lane La in the side A and the straight-ahead permission timing of the left-side entry lane La in the side A overlap with each other, the entry permission timings are determined to overlap with each other. In this case, the arbitration unit 132 prohibits crossing of the virtual lane lines VC.

In this case, the arbitration unit 132 arbitrates so that a position of an inflection point IP of each of the virtual lane lines VC in each area At is set to be substantially the same in an extending direction of the entry lane La or the exit lane Le. Accordingly, crossing of the virtual lane lines VC can be avoided.

Yet another example of the candidate pattern is a combination of travelable areas At connected to the same exit lane Le in the same side. In the example shown in FIG. 13, the combination between the virtual lane line VC connected from the entry lane La in the side A to the right-side exit lane Le the D side and the virtual lane line VC connected from the entry lane La in the side B to both the left-and-right-side exit lanes in the D side forms a candidate pattern.

Regarding the above combination, if no traffic light exists at the intersection I, or if the straight-ahead permission timing of the center entry lane La in the side A and the straight-ahead permission timing of the left-side entry lane La in the side A overlap with each other, the arbitration unit 132 determines that the entry permission timings overlap with each other and prevents crossing of the virtual lane lines VC.

Figure 14:
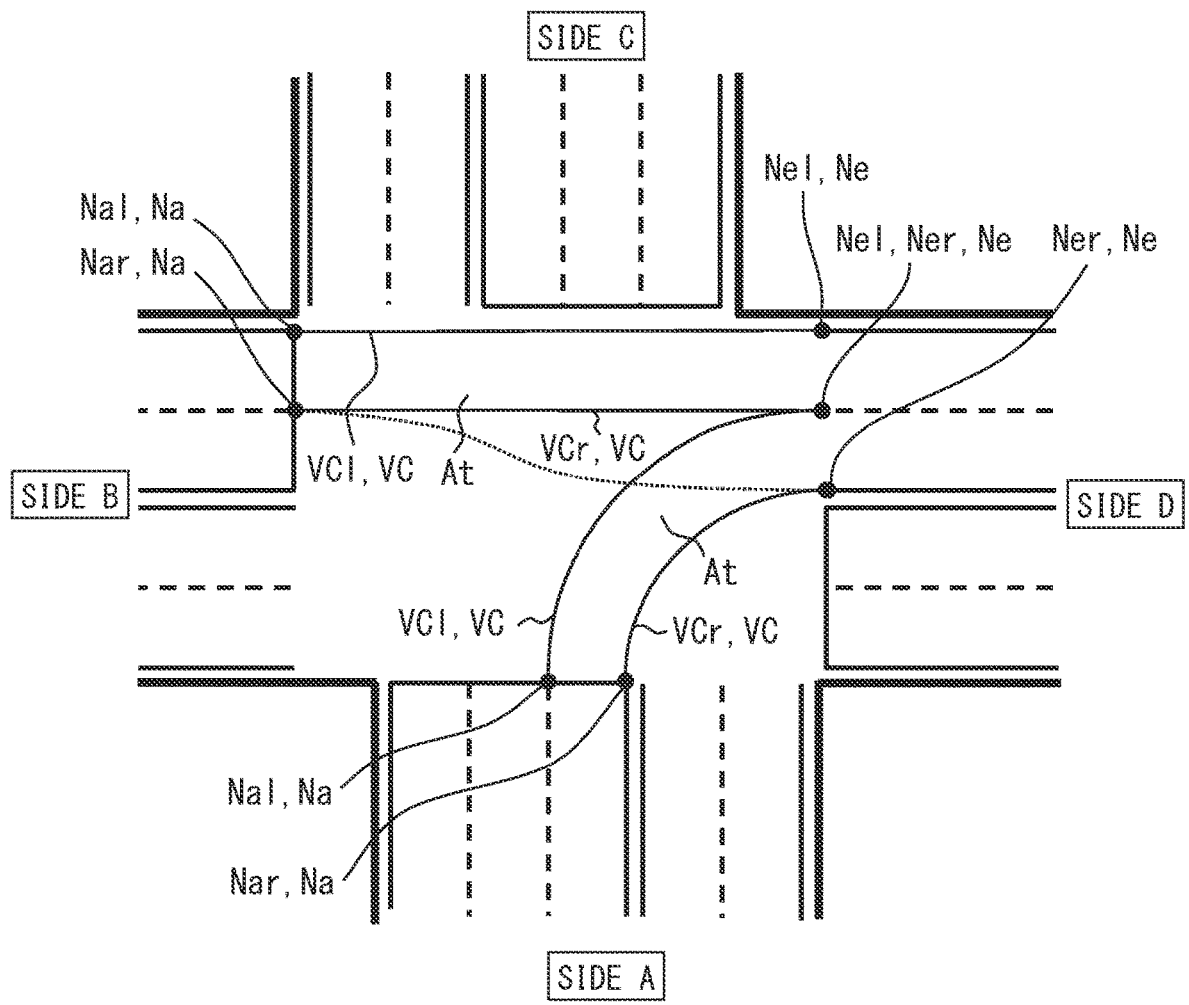
FIG. 14 is a diagram showing an example of arbitration of virtual lane lines in FIG. 13.

In this case, as shown in FIG. 14, the arbitration unit 132 arbitrates the virtual lane line VC connected to both the right-and-left sides exit lanes La in the D side from the entry lane La in the side B to connect to only the left-side exit lane Le in the D side. In other words, the arbitration unit 132 arbitrates the virtual lane lines VC so that each area At connects to a different exit lane Le.

Figure 15:
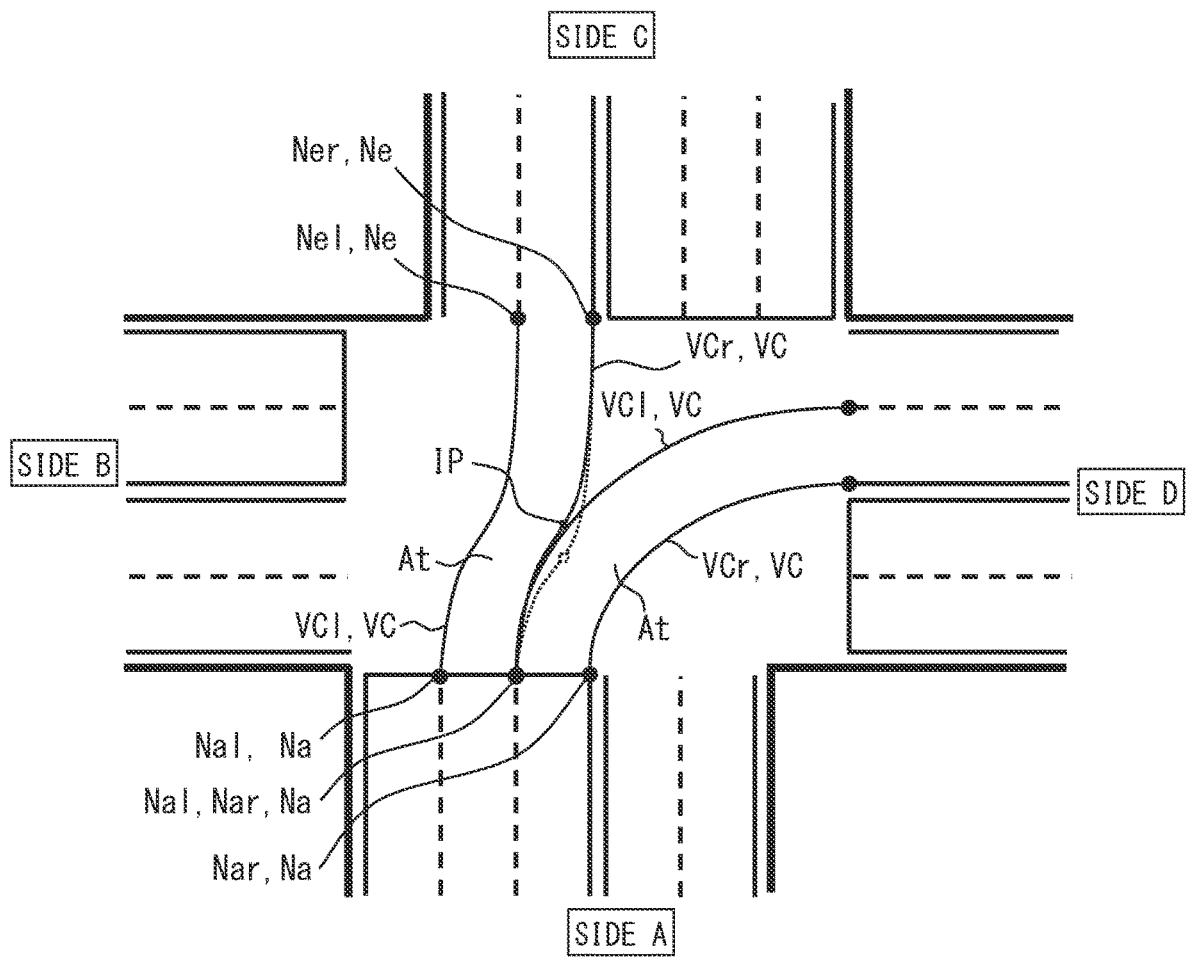
FIG. 15 is a diagram showing an example of arbitration for a combination of virtual lane markings for which crossing is prohibited.

Yet another example of the candidate pattern is a combination of virtual lane lines VC connected from different entry lanes La in the same side to different exit lanes Le in different sides. One of the virtual lane lines VC that constitutes the combination of the candidate pattern in FIG. 15 is the virtual lane line VC that connects the center entry lane La in the side A to the right-side exit lane Le in the C side. The other of the virtual lane lines VC that constitutes the combination of the candidate pattern is the virtual lane line VC that connects the right-side entry lane La in the side A to the right-side exit lane Le in the D side.

Regarding the above combination, if no traffic light exists at the intersection I, or if the straight-ahead permission timing of the center entry lane La and the turning-right permission timing of the right-side entry lane La in the side A overlap with each other, the entry permission timings are determined to overlap with each other. In this case, the arbitration unit 132 prohibits crossing of the virtual lane lines VC.

In this case, the arbitration unit 132 makes an arbitration by moving the inflection point IP of the right-side virtual line VCr connected from the center entry lane La in the side A to the right-side exit lane Le in the C side to a position so that crossing of the virtual lane lines VC is eliminated. In other words, the arbitration unit 132 changes the shape of the straight-ahead virtual lane line VC with priority over the right-turning virtual lane line VC. As a result, the arbitration unit 132 is able to complete the arbitration without changing the shape of the virtual lane line VC that is connected from the right-side entry lane La in the side A to the right-side exit lane La in the D side.

Figure 16:
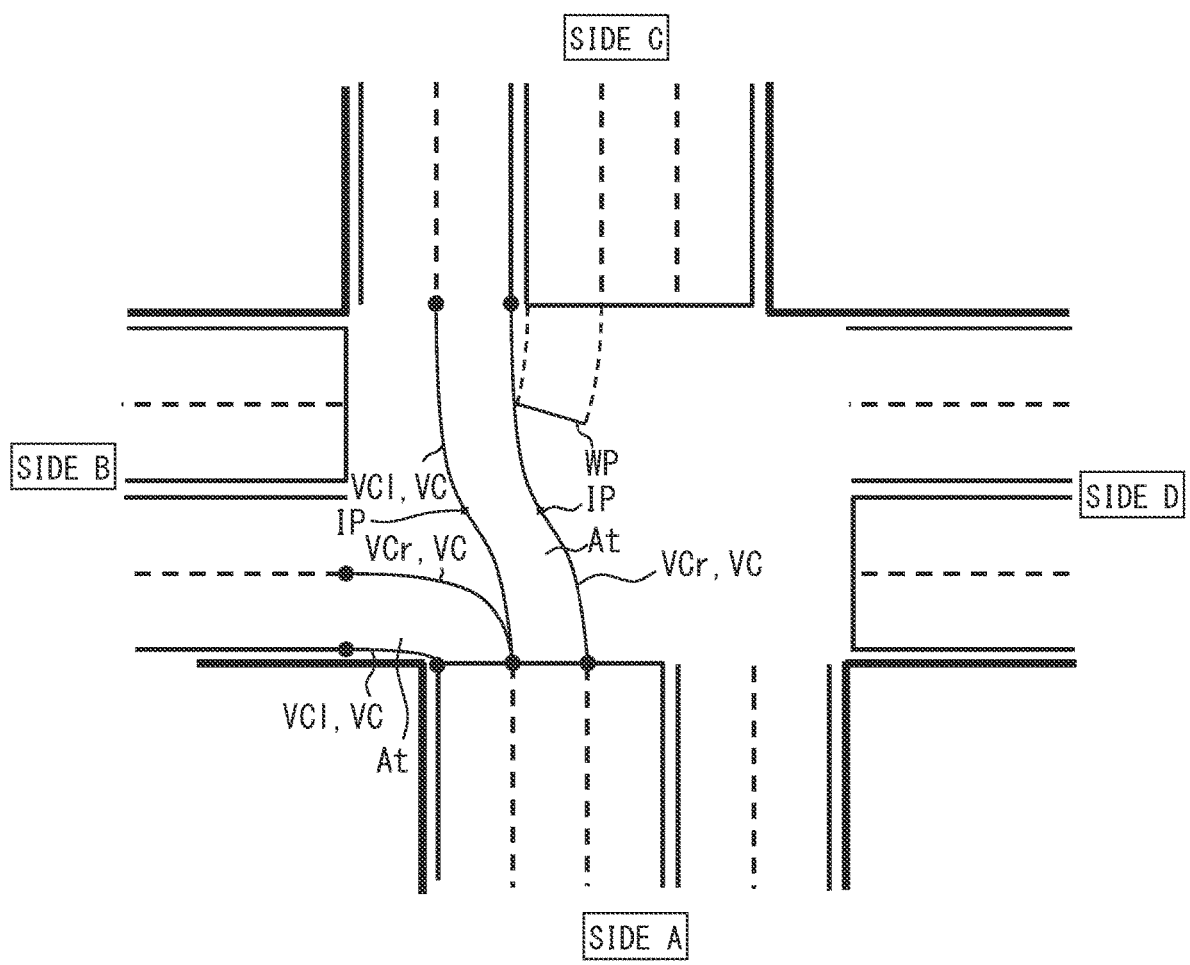
FIG. 16 is a diagram showing an example of arbitration for a combination of virtual lane markings for which crossing is prohibited.

Further, as shown in FIG. 16, the arbitration unit 132 restricts the movement of the inflection point IP up to a right-turn waiting position WP in the opposite side when making an arbitration on the straight-ahead virtual lane line VC. The arbitration unit 132 may specify the right-turn waiting position WP based on road markings such as a marking indicative of right and left turn methods. Alternatively, the arbitration unit 132 may specify the right-turn waiting position WP based on a travel history of the vehicle A at the intersection I or may set any predetermined position as the right-turn waiting position WP.

The distribution unit 140 distributes, to each vehicle A via the communication device 90, the map data for which the arbitration has been completed and the information of the virtual lane lines VC has been added. Note that the distribution unit 140 may distribute only the information on the virtual lane line VC when the map data has already been distributed.

Figure 17:
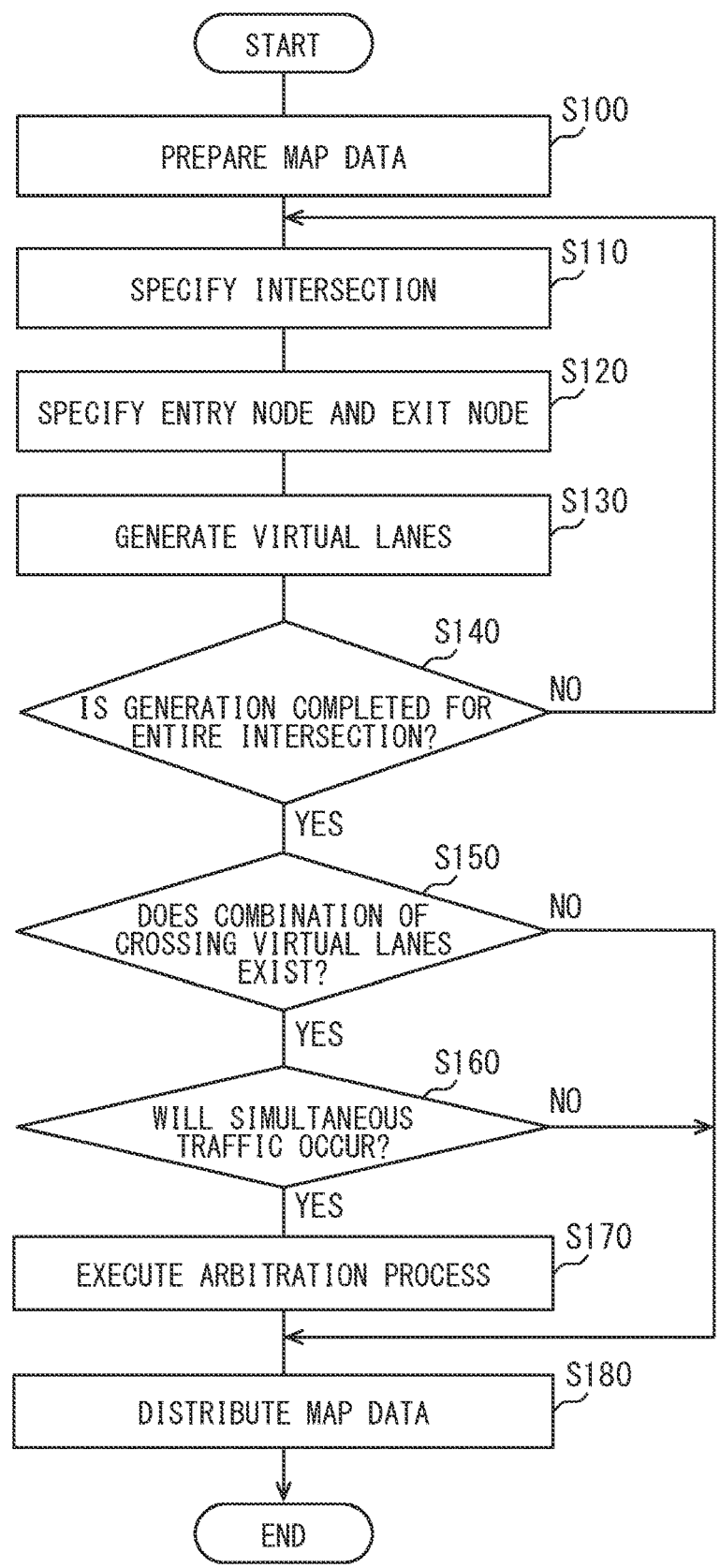
FIG. 17 is a flow chart showing an example of a travel assistance method executed by the server device.

Next, a flow of the travel assistance method executed by the server device 100 with functional blocks in cooperation with each other will be described below with reference to FIG. 17. In a flowchart to be described later, "S" means multiple steps of the flowchart to be executed by multiple instructions included in the program.

First, at S100, the map data preparation unit reads map data from the map DB and prepares it. Next, at S110, the node identification unit 120 identifies, from the map data, the intersection I as a section without lane markings. Subsequently, at S120, the node identification unit 120 identifies an assumed combination of the entry node Na and the exit node Ne at the intersection I.

Furthermore, at S130, the generation unit 131 generates a virtual lane line VC connecting the specified entry node Na and the specified exit node Ne. Then, at S140, the generation unit 131 determines whether the generation of the virtual lane lines VC for the entire intersection I has been completed. If the virtual lane lines VC are determined to have not been generated for the entire intersection I, the flow returns to S110.

On the contrary, if the virtual lane lines VC are determined to have been generated for the entire intersection I, the flow returns to S150. At S150, the arbitration unit 132 determines whether a combination of crossing virtual lane lines VC exists. If no combination of the intersecting virtual lane lines VC is determined to exist, the process shifts to S180. At S180, the distribution unit 140 distributes the map data including the information of the virtual lane lines VC to the vehicle at a predetermined timing.

If no combination of the crossing virtual lane lines VC is determined to exist, the process shifts to S160. At S160, the arbitration unit 132 determines whether vehicles may simultaneously travel in the combination of intersecting virtual lane lines VC. If the vehicles are not determined to simultaneously travel, the process shifts to S180. On the contrary, if the vehicles are determined to simultaneously travel, the process shifts to S170. At S170, arbitration is made for the combination of the crossing virtual lane lines VC. At S170, when arbitration is completed for all the combinations of crossing virtual lane lines VC that may cause simultaneous traffic by vehicles, the process shifts to S180. When the process at S180 is executed, this process ends.

It should be noted that the step of S120 described above is an example of a "specification process", and the steps of S130, S140, S150, S160, and S170 are examples of a "setting process".

According to the first embodiment described above, among the combinations of virtual lane lines VC where the vehicles A are determined to pass simultaneously based on the virtual lane lines VC, the virtual lane lines VC are set so as to avoid crossing thereof except the combinations that are determined to be unable to partially avoid crossing. Therefore, even if a plurality of vehicles A pass along each of the plurality of virtual lane lines VC, the lateral distance between the vehicles A can be sufficiently secured. Therefore, the vehicles A can travel smoothly.

Further, according to the first embodiment, crossing between a virtual lane line VC that serves as a guideline for right-turn traveling from a specific side at an intersection and a virtual lane line VC that serves as a guideline for right-turn traveling from the opposite side opposite to the specific side is avoided. Therefore, it is possible to reliably secure a literal distance between the vehicles A for the opposite right-turning combination in which the possibility that simultaneous traveling occurs is relatively high. Therefore, the vehicles A can travel smoothly.

In addition, according to the first embodiment, crossing between a virtual lane line VC that serves as a guideline for right-turn traveling toward a right-turning side from a specific side at an intersection and a virtual lane line VC that serves as a guideline for right-turn traveling from the right-turning side toward the specific side is avoided. Therefore, it is possible to reliably secure a lateral space between the vehicles A for the combination in which simultaneous traveling may occur. Therefore, the vehicles A can travel smoothly.

Furthermore, according to the first embodiment, crossing is avoided with respect to a combination of adjacent virtual lane lines VC that serve as guidelines for traveling from a specific side to the same side. Therefore, it is possible to reliably secure a lateral space between the vehicles A for the combination in which the possibility that simultaneous traveling occurs is relatively high. Therefore, the vehicles A can travel smoothly.

Further, according to the first embodiment, based on the traffic control information from the traffic light at the intersection, it is determined whether the vehicles A may travel simultaneously in the combination of the virtual lane lines VC. Therefore, not only the geometric setting pattern of the virtual lane lines VC but also the traffic control performed at the intersection I is taken into consideration when setting the virtual lane lines VC. Therefore, it is possible to more accurately determine combinations that require avoidance of crossing and combinations that do not require avoidance of crossing. As a result, since the virtual lane lines that do not require avoidance of crossing are allowed to cross each other, the degree of freedom in shaping the virtual lane lines VC for which crossing is not allowed can be increased.

In addition, according to the first embodiment, even in a combination of opposite right-turning virtual lane lines, if the right-turning timing from a specific side and the right-turning timing from the opposite side are timely offset by a traffic light, crossing is allowed. Therefore, the degree of freedom in shaping the virtual lane lines VC as to the opposing right-turn combination with different right-turning timings can be increased.

Further, according to the first embodiment, when the entry lane La in a specific side and the exit lane Le in the opposite side are offset from each other in the lane width direction, a curved virtual lane line VC having an inflection point IP is set and the position of the inflection point IP is adjusted so as to avoid crossing. Therefore, it is possible to avoid a change in the size of the travelable area At by adjusting only the inflection point IP.

Furthermore, according to the first embodiment, when avoiding crossing, adjustment of the position of the inflection point IP of the above-described virtual lane line is prioritized over adjustment of setting of the virtual lane line VC that serves as a guide for turning right or left from a specific side. Therefore, it is possible to avoid a change in the shape of the virtual lane line VC for turning right or left. Therefore, it is possible to reduce the influence on a lateral acceleration during right or left turn traveling due to the change in the shape of the virtual lane lines VC for turning right or left.

Second Embodiment

In the second embodiment, a modification to the server device 100 in the first embodiment will be described. Constituent elements in FIG. 18 and those in the drawings of the first embodiment that are designated with the same symbols are similar constituent elements and produce similar operational advantages.

Figure 18:
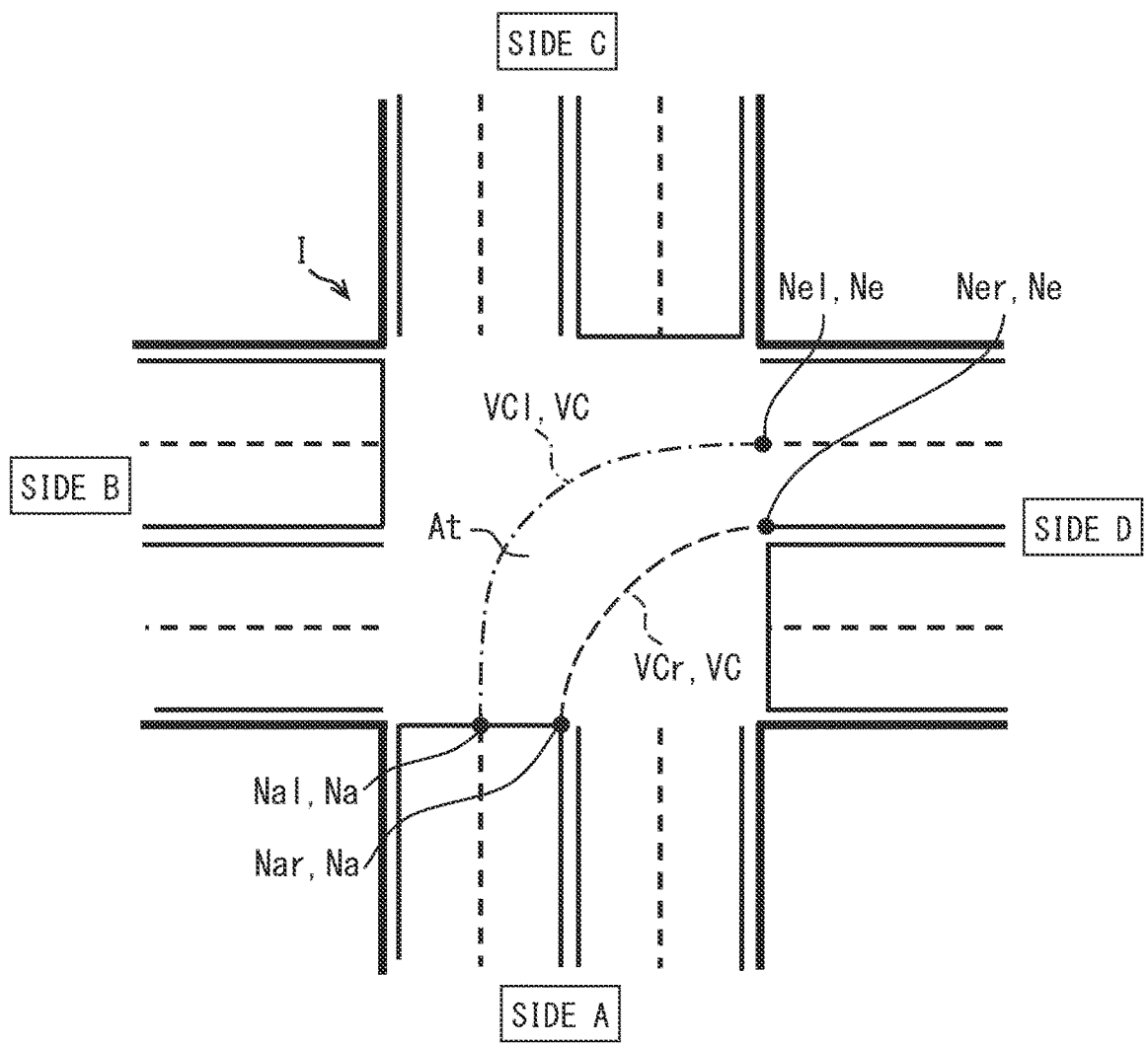
FIG. 18 is a diagram showing one examples of virtual lane lines generated in a second embodiment.

The generation unit 131 in the second embodiment is designed to generate virtual lane lines such that both a right-turning trajectory with a small turn and a right-turning trajectory with a large turn can be generated in generating the virtual lane lines VC connected to the exit node Ne in the right-turn side. Specifically, as shown in FIG. 18, the generation unit 131 generates a right-side virtual line VCr corresponding to the right-turning trajectory with a small turn and a left-side virtual line VCl corresponding to the right-turning trajectory with a large turn as the virtual lane line VC.

The left-side virtual line VCl corresponding to the right-turning trajectory with a large turn is, for example, a virtual line formed of a straight line extending a predetermined distance from the entry node Nal and a spline curve starting at the end of the straight line and ending at the exit node Nel. The right-side virtual line VCr corresponding to the right-turning trajectory with a small turn is a spline curve with the starting point at the entry node Nar and the ending point at the exit node Ner.

Third Embodiment

In the third embodiment, a modification to the server device 100 in the first embodiment will be described. Constituent elements in FIG. 19 and those in the drawings of the first embodiment that are designated with the same symbols are similar constituent elements and produce similar operational advantages.

Figure 19:
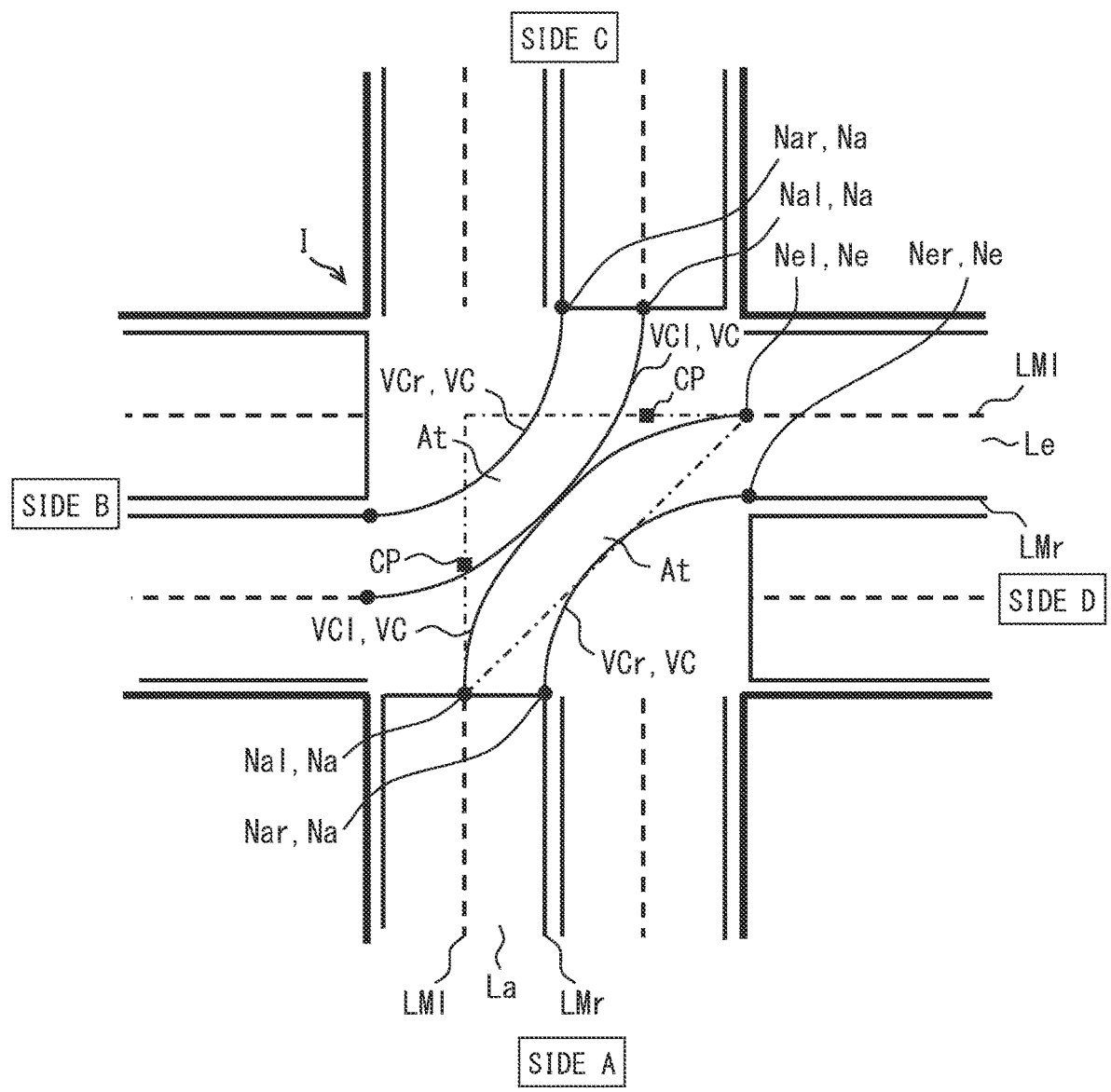
FIG. 19 is a diagram showing one example of arbitration in a third embodiment.

The arbitration unit 132 in the third embodiment adjusts the position of a control point CP when arbitrating the crossing virtual lane lines VC. That is, as shown in FIG. 19, the arbitration unit 132 performs arbitration by moving the control point CP to a position such that the virtual lane lines VC do not cross each other. Note that FIG. 19 shows movement of the control point CP for the left-side virtual line VCl connecting between the side A and the side D. The arbitration unit 132 similarly moves the left-side virtual line VCl connecting between the side C and the side B. The arbitration unit 132 may also adjust the position of the control point CP for each of right-side virtual lines VCr, and control the shape of the virtual lane line VC to secure the width of each of the travelable areas At by a predetermined distance.

According to the third embodiment, arbitration is performed by moving the control point CP. Therefore, the virtual lane line VC can have a smooth curved shape. Therefore, deterioration of ride comfort can be avoided when the vehicle A travels based on the virtual lane line VC.

Fourth Embodiment

Figure 20:
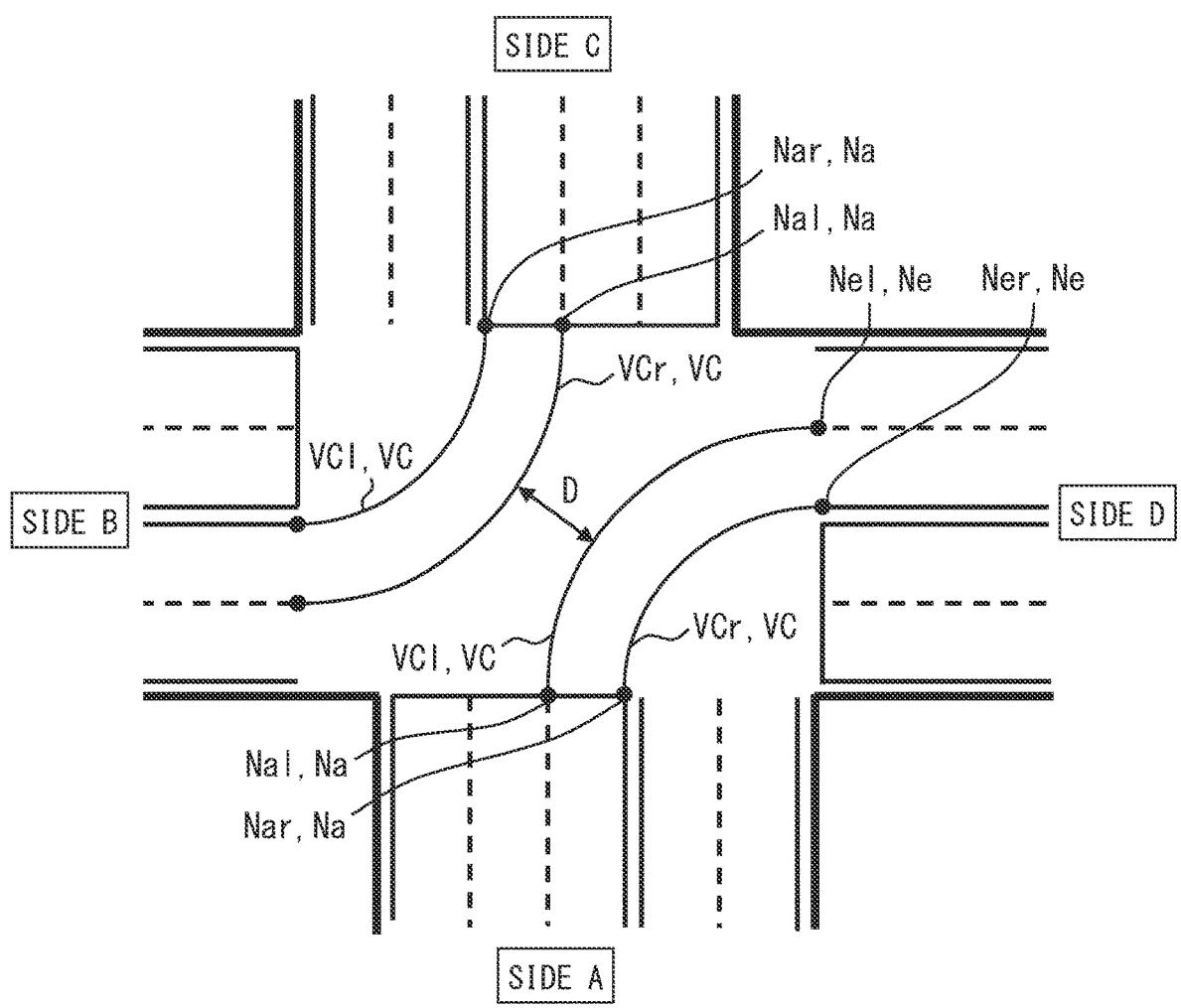
FIG. 20 is a diagram showing one example of arbitration in a fourth embodiment.

In the fourth embodiment, a modification to the server device 100 in the first embodiment will be described. Constituent elements in FIG. 20 and those in the drawings of the first embodiment that are designated with the same symbols are similar constituent elements and produce similar operational advantages.

The arbitration unit 132 according to the fourth embodiment prohibits the virtual lane lines VC from approaching each other into an avoidance range. More specifically, if the combination is formed such that a closest distance D between the virtual lane lines VC falls within the avoidance range, the arbitration unit 132 arbitrates the distance D to be outside of the avoidance range when simultaneous traffic by vehicles can occur. In particular, the arbitration unit 132 performs the above arbitration when the exit nodes Ne are included in the exit lanes Le in different sides.

In the fourth embodiment, approaching the virtual lane lines VC within the avoidance range is an example of an "avoidance condition".

According to the above-described fourth embodiment, when the vehicles A travel simultaneously based on the virtual lane lines VC, the distance between the vehicles A can be secured more reliably. Therefore, smooth traveling by the vehicles A can be realized more reliably.

Fifth Embodiment

Figure 21:
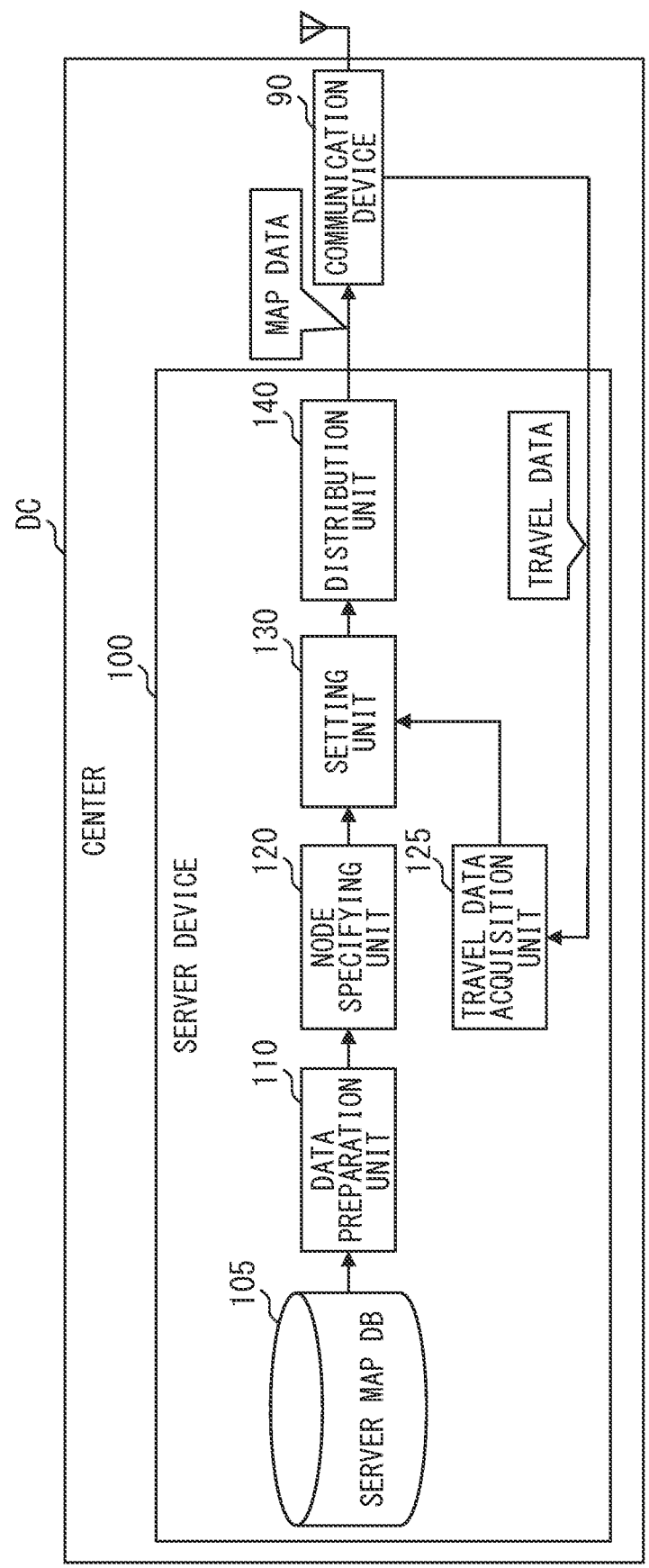
FIG. 21 is a block diagram showing one example of functions possessed by the server device according to a fifth embodiment.

In the fifth embodiment, a modification to the server device 100 in the first embodiment will be described. Constituent elements in FIG. 21 and those in the drawings of the first embodiment that are designated with the same symbols are similar constituent elements and produce similar operational advantages.

The travel assistance device according to the fifth embodiment includes a travel data acquisition unit 125. The travel data acquisition unit 125 acquires travel data from the vehicle A via the communication device 90. The travel data includes at least travel trajectory information and travel time information of the vehicle A in the intersection I. The travel data acquisition unit 125 provides the acquired travel data to the setting unit 130.

The setting unit 130 in the fifth embodiment generates virtual lane lines VC based on the provided travel data. Specifically, the setting unit 130 extracts travel data from which simultaneous traffic is presumed to occur. The setting unit 130 uses the travel data to generate the virtual lane lines VC so that the virtual lane lines VC that may cause simultaneous traffic do not cross each other. For example, the setting unit 130 may generate each virtual lane line VC based on travel trajectories of the vehicles A that simultaneously travel to avoid each other. As a result, the setting unit 130 can generate virtual lane lines VC that avoid crossing each other without determining whether the once generated virtual lane lines VC are allowed to cross each other.

Figure 22:
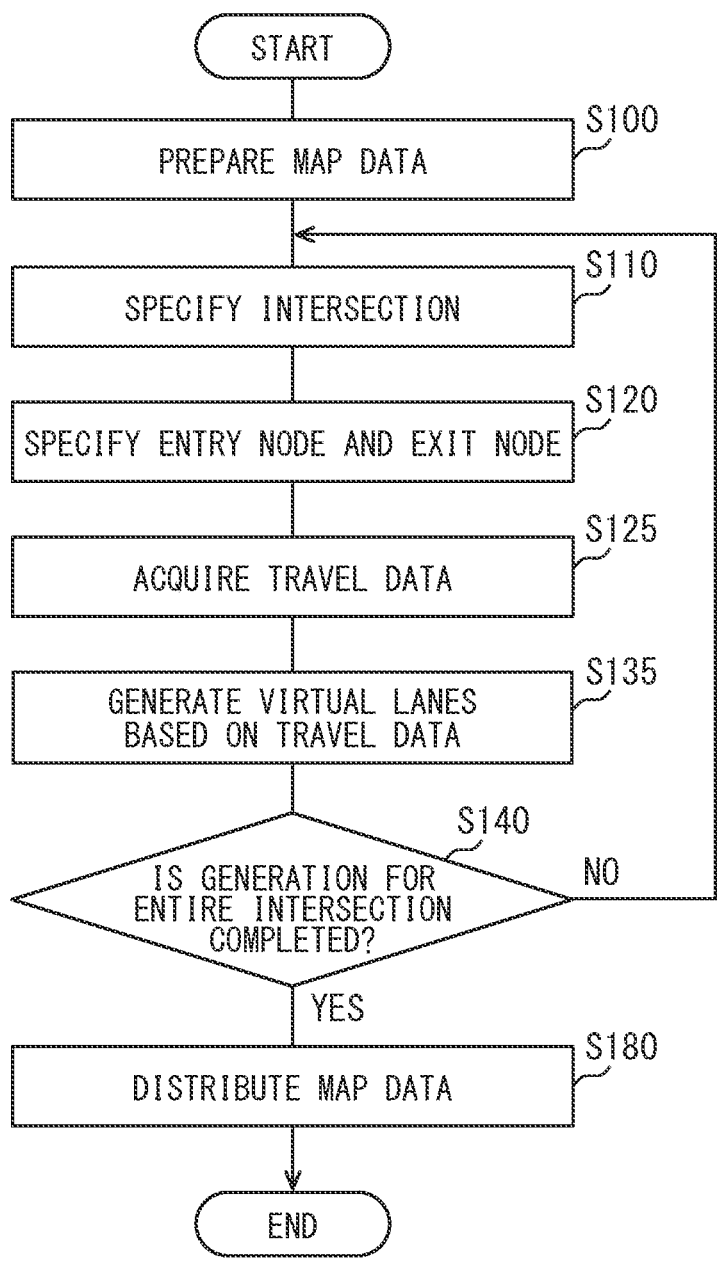
FIG. 22 is a flow chart showing one example of a travel assistance method executed by the server device in a fifth embodiment.

The flow of the travel assistance method executed by the server device 100 according to the fifth embodiment will be described with reference to FIG. 22. After the step of S120, the process shifts to S125. At step S125, the travel data acquisition unit 125 acquires the travel data. At subsequent step S135, the setting unit 130 generates virtual lane lines VC based on the travel data. After the step of S135, the process proceeds to S140. Since the virtual lane lines VC that avoid crossing each other are generated based on the travel data, the steps corresponding to S150 to S170 in the first embodiment are omitted.

According to the fifth embodiment described above, the virtual lane lines VC are arbitrated based on the travel data of the vehicle A. Also in this configuration, as in the first embodiment, the vehicle A can travel smoothly according to the virtual lane line VC. Further, according to the fourth embodiment, since the travel data at the actual intersection I is used, it is possible to generate the virtual lane lines VC that are in line with actual traffic conditions.

Note that if there is a combination of the entry node Na and the exit node Ne for which travel data that can be used to generate a virtual lane line VC is not acquired, the setting unit 130 may execute, for that combination, the generation process and the arbitration process as described in the first embodiment.

Sixth Embodiment

Figure 23:
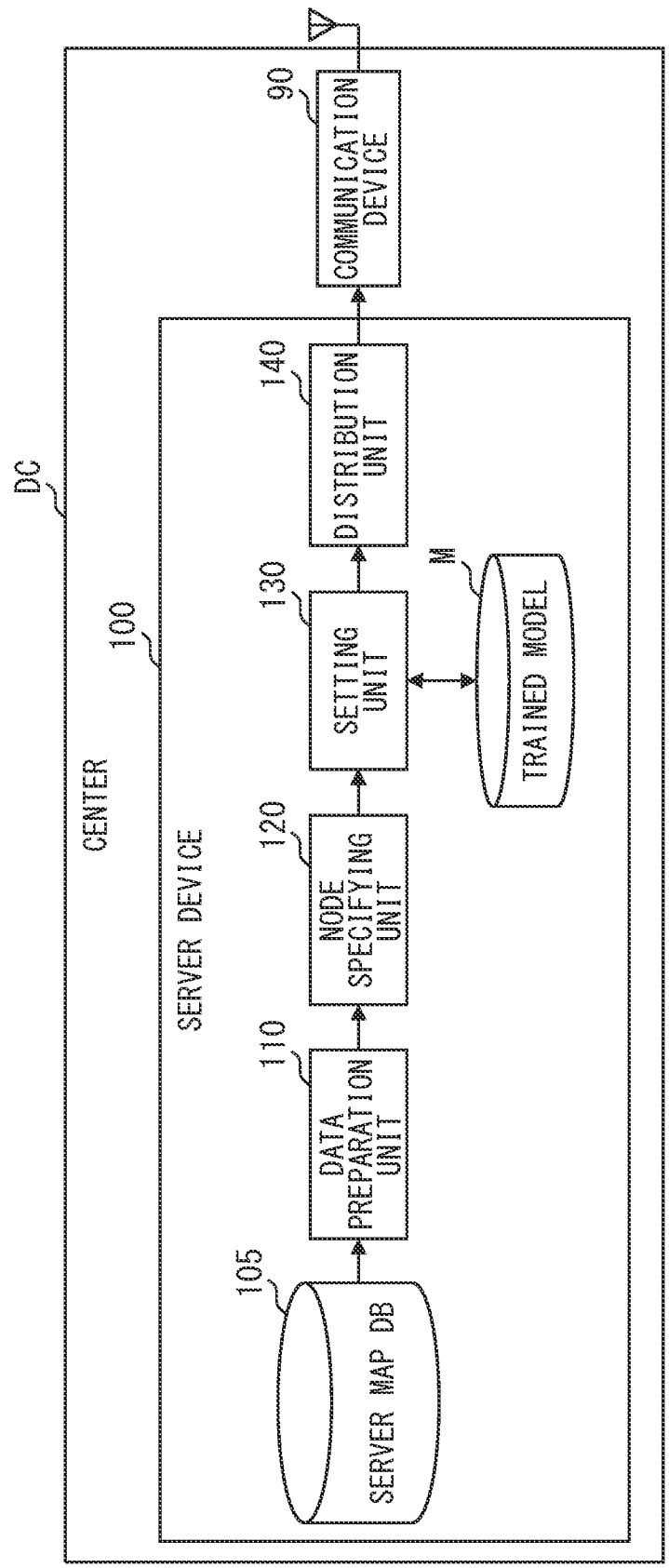
FIG. 23 is a block diagram showing one example of functions possessed by the server device according to a sixth embodiment.

In the sixth embodiment, a modification to the server device 100 in the first embodiment will be described. Constituent elements in FIGS. 23 and 24 and those in the drawings of the first embodiment that are designated with the same symbols are similar constituent elements and produce similar operational advantages.

A travel assistance device according to the sixth embodiment includes a learned model M. The learned model M is, for example, a model that has been learned to output a virtual lane line VC in response to input of shape information of an intersection I and traffic control information of a traffic light. Among the combinations of virtual lane lines VC that are determined to allow the vehicles A to pass simultaneously based on the virtual lane lines VC, the virtual lane lines VC are set so as to avoid crossing except the combinations that are determined to be unable to partially avoid crossing are selected.

The generation unit 131 inputs the shape information and the traffic control information stored in prepared map data into the learned model M to generate virtual lane lines VC.

Figure 24:
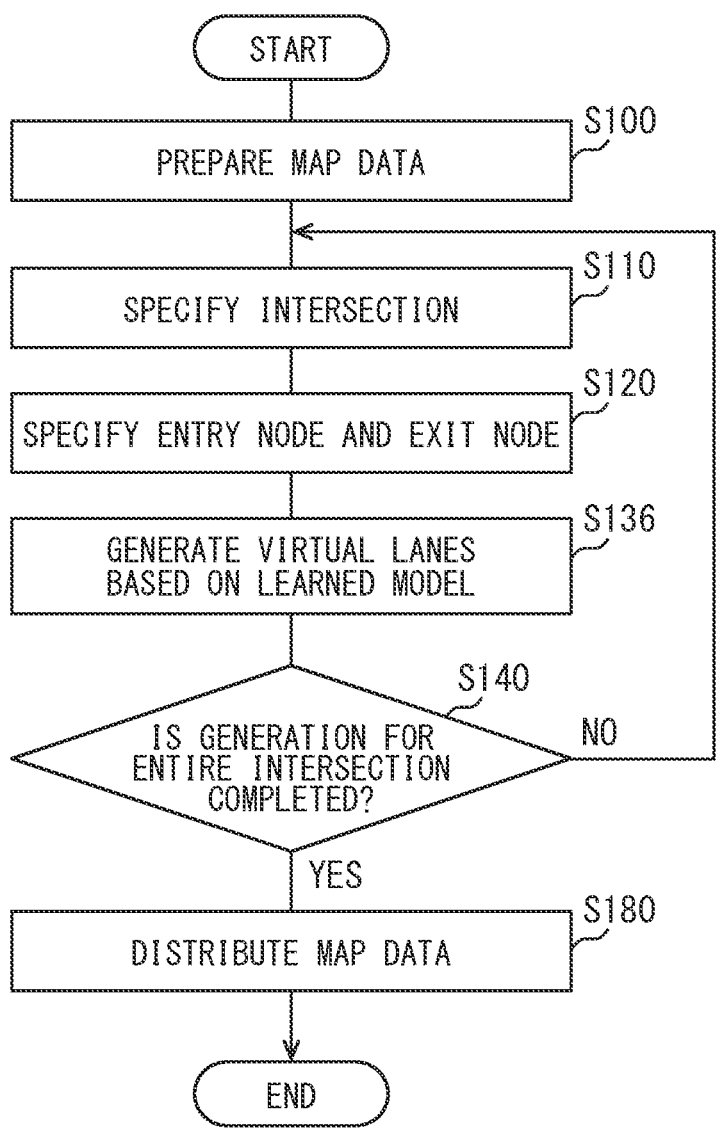
FIG. 24 is a flow chart showing one example of a travel assistance method executed by the server device in the fifth embodiment.

The flow of the travel assistance method executed by the server device 100 according to the sixth embodiment will be described with reference to FIG. 24. After the step of S120, the process shifts to S136. At S136, the setting unit 130 inputs the map data into the learned model M to generate virtual lane lines VC as an output result. After the step of S136, the process proceeds to S140. Since the virtual lane lines VC that are designed to avoid crossing each other are generated based on the learned model M, the steps corresponding to S150 to S170 in the first embodiment are omitted.

According to the sixth embodiment described above, the virtual lane lines VC are arbitrated based on the learned model M. Also in this configuration, as in the first embodiment, the vehicle A can travel smoothly according to the virtual lane line VC.

Seventh Embodiment

Figure 25:
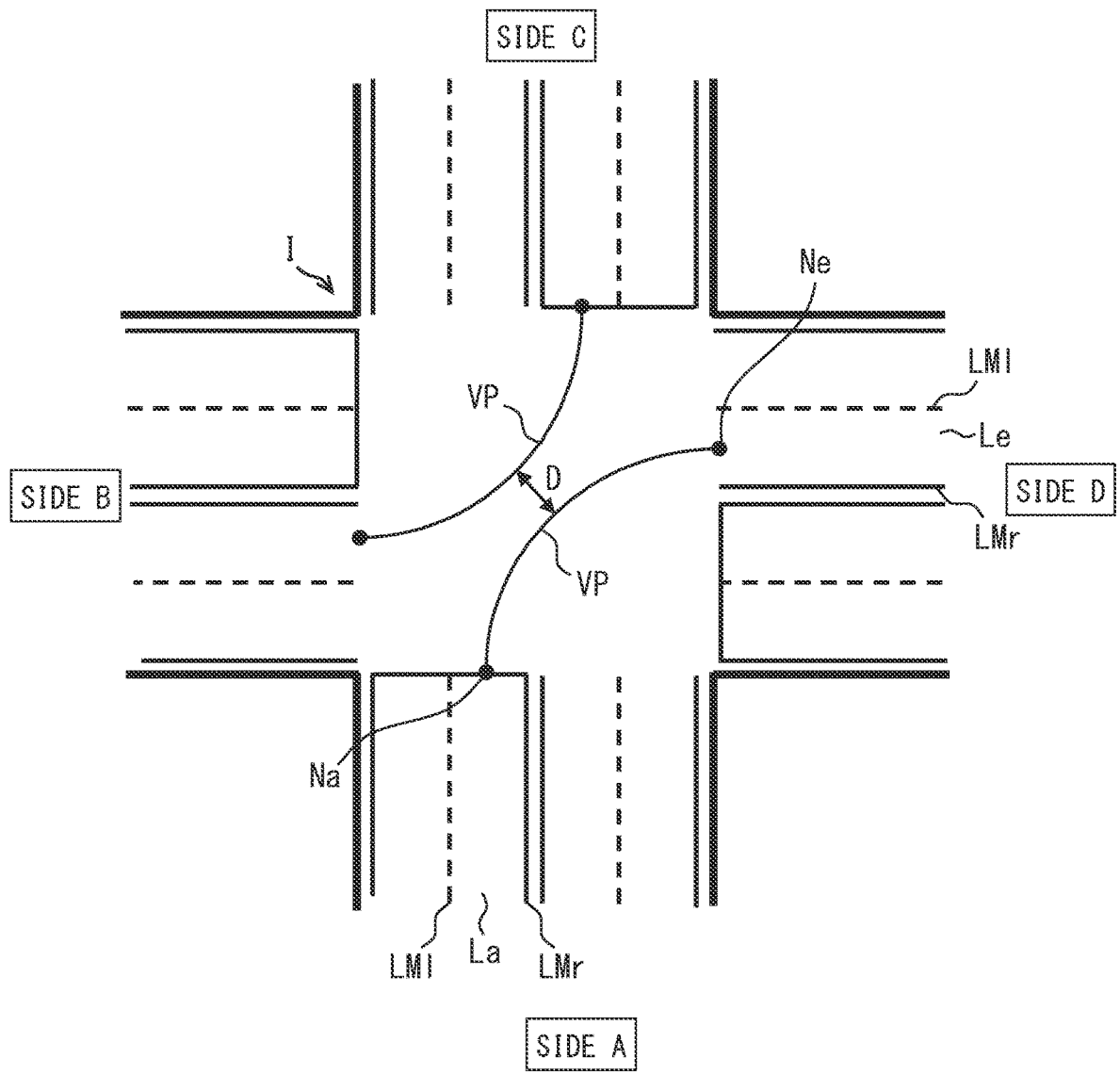
FIG. 25 is a diagram showing one example of virtual lane lines generated in a seventh embodiment.

In the seventh embodiment, a modification to the server device 100 in the first embodiment will be described. Constituent elements in FIG. 25 and those in the drawings of the first embodiment that are designated with the same symbols are similar constituent elements and produce similar operational advantages.

The node identification unit 120 according to the sixth embodiment identifies one entry node Na and one exit node Na for each of lanes. For example, the node identification unit 120 may set an entry node or an exit node at an intermediate position between the end nodes in both the left-side line and the right-side line. Alternatively, if the map data includes center end point information of the lane close to the intersection I, the center end point may be set as a node.

The generation unit 131 generates a virtual path line VP connecting between the entry node Na and the exit node Ne as a virtual connection object. In this case, the arbitration unit 132 may arbitrate the virtual path lines so that the closest distance between the virtual path lines VP exceeds the prohibited range when simultaneous traffic by vehicles may occur in the path lines.

The virtual path line VP is used as a guide for the vehicle A to travel in the same manner as the virtual lane line VC. For example, the automated-driving control unit 58 of the automated-driving ECU 50 controls the behavior of the vehicle A so as to follow the virtual path line VP. The automated-driving control unit 58 may control the vehicle A so that the virtual path line VP is substantially positioned at the center of the width direction of the vehicle or the vehicle travels while maintaining a predetermined offset distance from the virtual path line VP according to the surrounding environment.

Other Embodiments

The disclosure in the present specification is not limited to the illustrated embodiments. The disclosure encompasses the illustrated embodiments and variations based on the embodiments by those skilled in the art. For example, the present disclosure is not limited to the combinations of components and/or elements shown in the embodiments.

The present disclosure may be implemented in various combinations. The present disclosure may have additional members which may be added to the embodiments. The present disclosure encompasses the embodiments where some components and/or elements are omitted. The present disclosure encompasses replacement or combination of components and/or elements between one embodiment and another. The disclosed technical scope is not limited to the descriptions of the embodiments. It should be understood that part of disclosed technical scope is indicated by recitation of claims, and includes every modification within the equivalent meaning and the recitation of the scope of claims.

Figure 26:
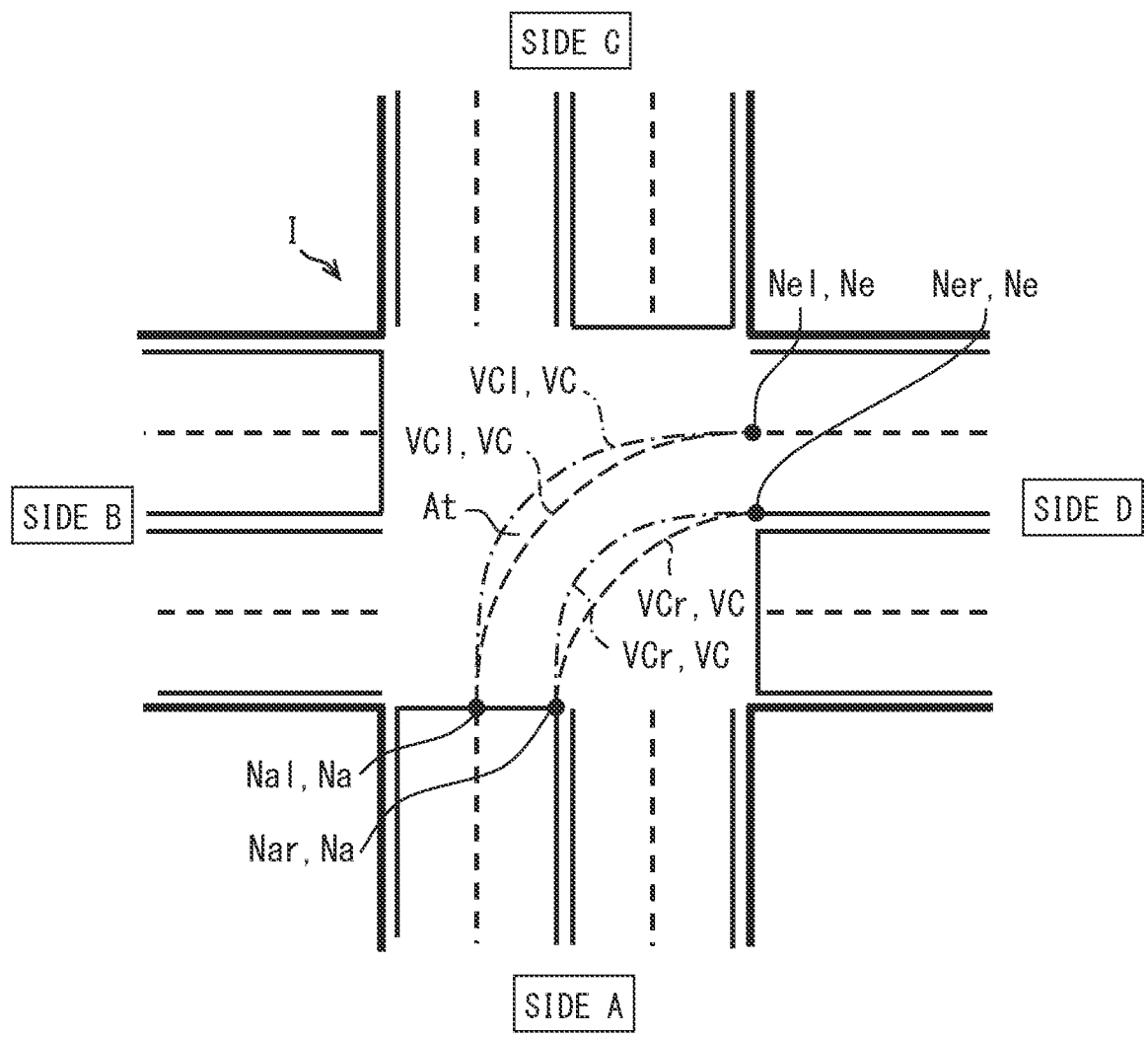
FIG. 26 is a diagram showing one example of virtual lane lines generated in another embodiment.

As a modification to the second embodiment, as shown in FIG. 26, the generation unit 131 may independently generate virtual lane lines corresponding to the right-turning trajectory with a small turn and virtual lane lines corresponding to the right-turning trajectory with a large turn.

In the above-described embodiment, the arbitration unit 132 extracts candidate patterns in which simultaneous traffic by vehicles may occur and determines whether to permit crossing of the candidate patterns based on traffic light information. Alternatively, the arbitration unit 132 may always prohibit the candidate patterns from crossing each other. Alternatively, the arbitration unit 132 may simply determine whether to allow crossing based on traffic light information without extracting candidate patterns.

Figure 27:
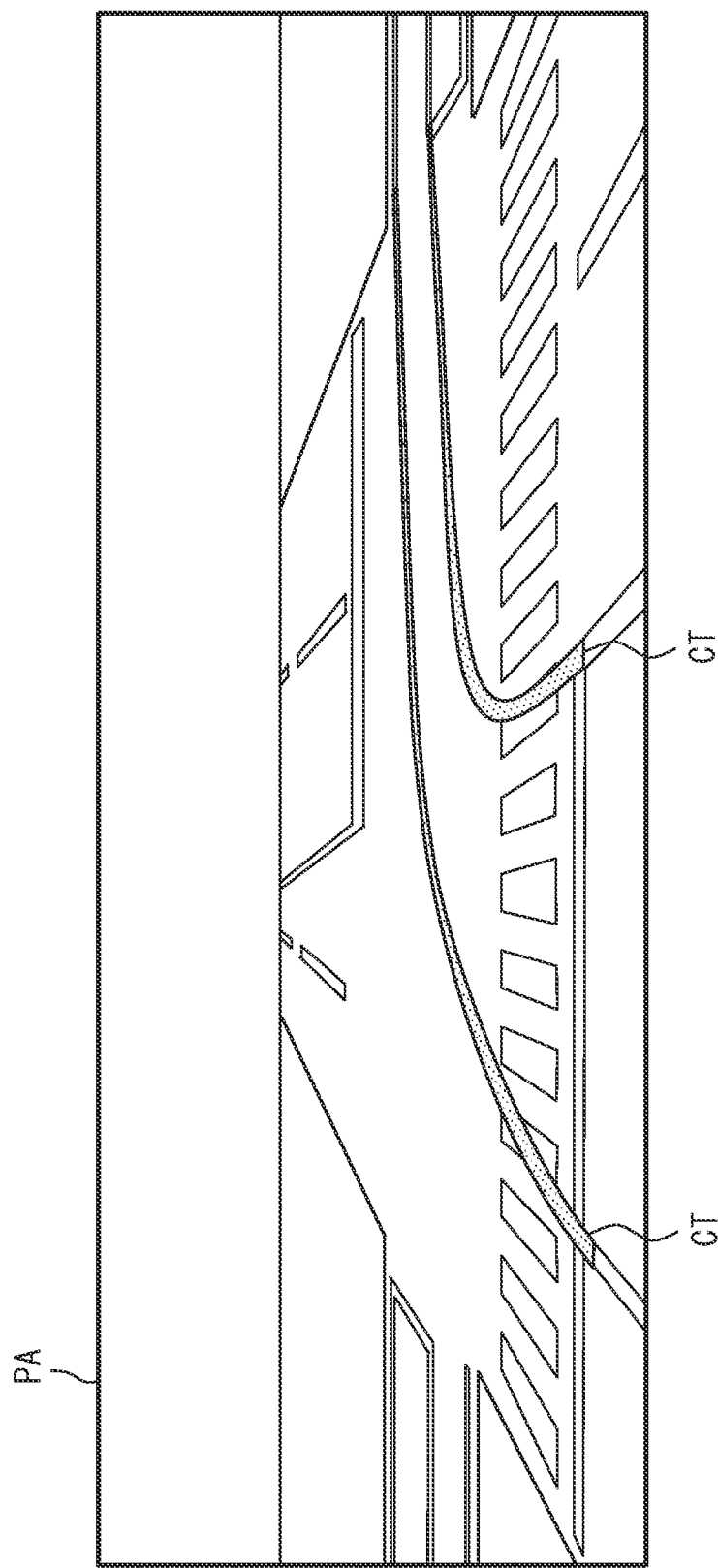
FIG. 27 is a diagram showing a usage example of virtual lane lines in another embodiment.

In the above-described embodiments, the virtual lane lines VC are used when generating the travel trajectories during automated driving, but the virtual lane lines VC may be used for other purposes. For example, the HCU 40 may cause the display device 41 to display contents corresponding to the virtual lane lines VC as a guide for the drive to passing through the intersection I during manual-driving. For example, when the display device 41 is a head-up display, the HCU 40 displays the lane marking contents CT so as to be visually superimposed on the road surface of the intersection I as shown in FIG. 27.

Figure 28:
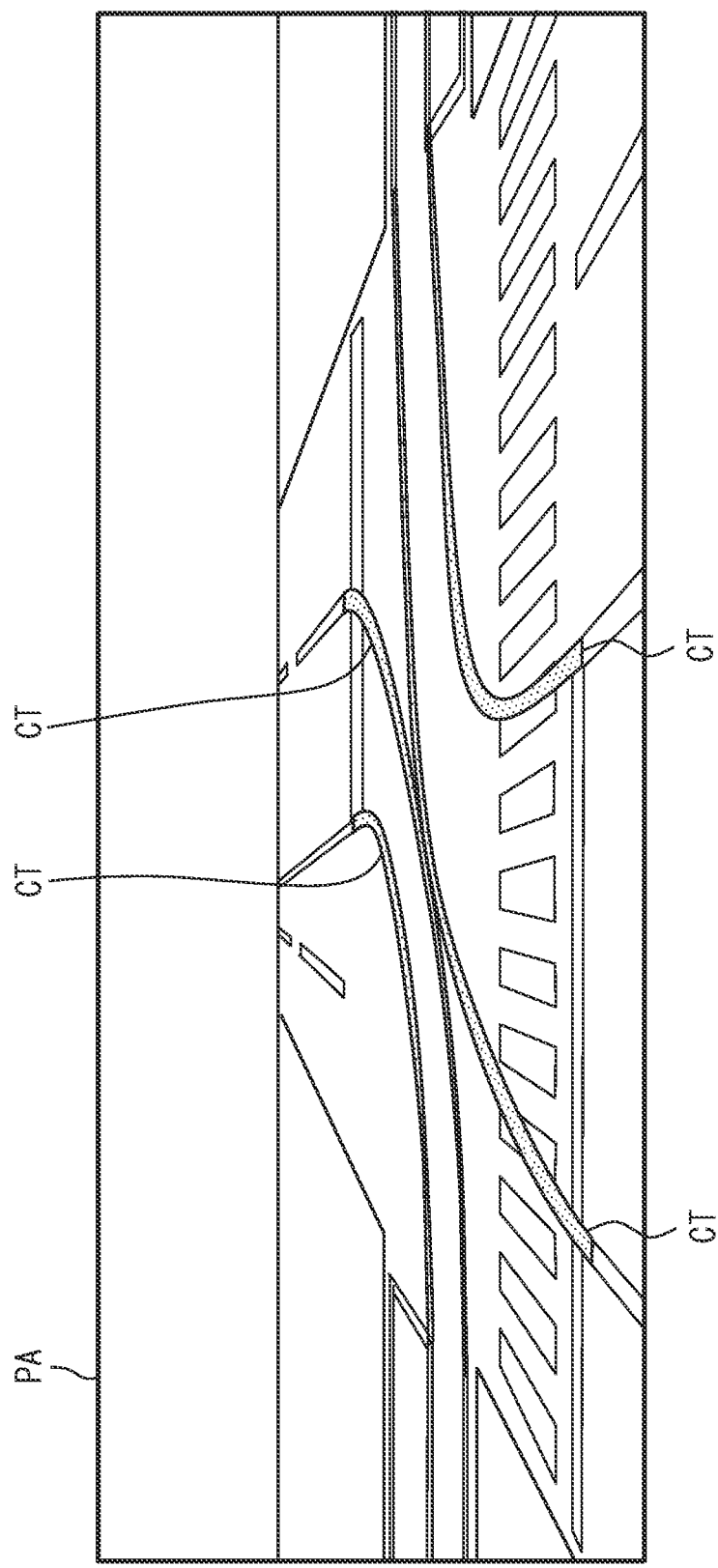
FIG. 28 is a diagram showing a modification to the usage example in FIG. 27.

The marking line contents CT to be displayed may be contents formed of a pair of lines. The lane marking contents are contents representing at least a virtual lane line corresponding to the planned travel route for the vehicle. Alternatively, the lane marking contents may include contents representing a virtual lane line corresponding to the planned travel route for another vehicle that is traveling through the intersection I at the same time. For example, as shown in FIG. 28, contents representing virtual lane lines corresponding to the planned travel route for the right-turning vehicle in the opposite side may also be displayed as lane marking contents.

The description in the above embodiments is adapted to the region where left-hand traffic is designated by law. In the country or region where right-hand traffic is designated by law (i.e., the right-hand traffic environment), left and right are reversed. That is, the "opposing right-turn combination" and "right-turn direction" in the left-hand traffic environment correspond to the "opposing left-turn combination" and "left-turn direction" in the right-hand traffic environment. For example, the combination illustrated in FIG. 11 under the right-hand environment may be a combination (second combination) of the turning-left virtual lane from the specific side to the side B and the turning-right virtual lane from the side B to the specific side under the left-hand environment.

The server device 100 may be a special purpose computer configured to include at least one of a digital circuit and an analog circuit as a processor. In particular, the digital circuit is at least one type of, for example, an ASIC (Application Specific Integrated Circuit), a FPGA (Field Programmable Gate Array), an SOC (System on a Chip), a PGA (Programmable Gate Array), a CPLD (Complex Programmable Logic Device), and the like. Such a digital circuit may include a memory in which a program is stored.

The server device 100 may be a set of computer resources linked by a computer or data communication device. For example, some of the functions provided by the server device 100 in the above-described embodiment may be realized by another ECU.

The invention claimed is:

1. A travel assistance device that assists in traveling for a vehicle, comprising:
   a specifying unit that is configured to specify an entry node of an entry lane connected to an intersection and an exit node of an exit lane connected to the intersection based on map data including information of the intersection, the entry node being an end node of the entry lane at the intersection and the exit node being an end node of the exit lane at the intersection; and
   a setting unit that is configured to set virtual connection objects each of which is a guide for the vehicle to travel and connects the entry node and the exit node, wherein
   an avoidance condition is defined as at least one of a condition that the virtual connection objects are close to each other within an avoidance range and a condition that the virtual connection objects overlap with each other, and
   the setting unit is further configured to set a combination of the virtual connection objects where simultaneous traffic by vehicles may occur to not satisfy the avoidance condition except for a combination of the virtual connection objects where the avoidance condition is inevitably satisfied, wherein
   a combination of a virtual connection object that is a guide for right-turning travel from a specific side at the intersection and a virtual connection object that is a guide for right-turning travel from an opposing side at the intersection opposite to the specific side is defined as an opposing right-turn combination under a left-hand traffic environment,
   a combination of a virtual connection object that is a guide for left-turning travel from the specific side at the intersection and a virtual connection object that is a guide for left-turning travel from the opposing side at the intersection is defined as an opposing left-turn combination under a right-hand traffic environment, and
   the setting unit is configured to set the virtual connection objects to not satisfy the avoidance condition for at least one of the opposing right-turn combination and the opposing left-turn combination,
   wherein
   a travel trajectory for a vehicle is determined based on the virtual connection objects to not satisfy the avoidance condition, and
   the vehicle performs automated driving according to the travel trajectory.

2. The travel assistance device according to claim 1, wherein
   the setting unit is configured to:
      set the opposing right-turn combination of the virtual connection objects to allow the avoidance condition to be satisfied if a turning-right timing from the specific side and a turning-right timing from the opposing side are controlled to be offset by a traffic light; and set the opposing left-turn combination of the virtual connection objects to allow the avoidance condition to be satisfied if a turning-left timing from the specific side and a turning-left timing from the opposing side are controlled to be offset by the traffic light.

3. The travel assistance device according to claim 1, wherein
a combination of a virtual connection object that is a guide for right-turning travel from a specific side to a right-turn side at the intersection and a virtual connection object that is a guide for left-turning travel from the right-turn side to the specific side at the intersection is defined as a first combination under a left-hand traffic environment,
a combination of a virtual connection object that is a guide for left-turning travel from the specific side to a left-turn side at the intersection and a virtual connection object that is a guide for right-turning travel from the turn-left side to the specific side at the intersection is defined as a second combination under a right-hand traffic environment, and
the setting unit is configured set the virtual connection objects to not satisfy the avoidance condition for at least one of the first combination and the second combination.

4. A travel assistance device that assists in traveling for a vehicle, comprising:
a specifying unit that is configured to specify an entry node of an entry lane connected to an intersection and an exit node of an exit lane connected to the intersection based on map data including information of the intersection, the entry node being an end node of the entry lane at the intersection and the exit node being an end node of the exit lane at the intersection; and
a setting unit that is configured to set virtual connection objects each of which is a guide for the vehicle to travel and connects the entry node and the exit node, wherein
an avoidance condition is defined as at least one of a condition that the virtual connection objects are close to each other within an avoidance range and a condition that the virtual connection objects overlap with each other, and
the setting unit is further configured to set a combination of the virtual connection objects where simultaneous traffic by vehicles may occur to not satisfy the avoidance condition except for a combination of the virtual connection objects where the avoidance condition is inevitably satisfied, wherein
a combination of a virtual connection object that is a guide for right-turning travel from a specific side to a right-turn side at the intersection and a virtual connection object that is a guide for left-turning travel from the right-turn side to the specific side at the intersection is defined as a first combination under a left-hand traffic environment,
a combination of a virtual connection object that is a guide for left-turning travel from the specific side to a left-turn side at the intersection and a virtual connection object that is a guide for right-turning travel from the turn-left side to the specific side at the intersection is defined as a second combination under a right-hand traffic environment, and
the setting unit is configured set the virtual connection objects to not satisfy the avoidance condition for at least one of the first combination and the second combination, wherein
a travel trajectory for a vehicle is determined based on the virtual connection objects to not satisfy the avoidance condition, and
the vehicle performs automated driving according to the travel trajectory.

5. The travel assistance device according to claim 1, wherein
adjacent virtual connection objects are the virtual connection object that guide for the vehicle to travel from a specific side to another side at the intersection, and
the setting unit is configured to set a combination of the adjacent virtual connection objects to not satisfy the avoidance condition.

6. The travel assistance device according to claim 1, wherein
the setting unit is configured to determine whether the simultaneous traffic by the vehicles may occur in the combination of the virtual connection objects based on traffic control information of a traffic light at the intersection.

7. The travel assistance device according to claim 1, wherein
the setting unit is configured to:
set each of the virtual connection objects to have a curved shape with an inflection point if the entry lane in a specific side at the intersection is offset in a vehicle width direction from the exit lane in an opposing side opposite to the specific side at the intersection; and
adjust a position of the inflection point of each of the virtual connection objects to not satisfy the avoidance condition.

8. The travel assistance device according to claim 6, wherein
the setting unit is configured to prioritize adjustment of the position of the inflection point over adjustment of setting of a virtual connection object that is a guide for right-or-left turning travel from the specific side.

9. The travel assistance device according to claim 1, wherein
the setting unit is configured to:
set each of the virtual connection objects to have a curved shape with a control point that defines the curved shape; and
adjust a position of the control point of each of the virtual connection objects to not satisfy the avoidance condition.

10. A travel assistance device that assists in traveling for a vehicle, comprising:
a specifying unit that is configured to specify entry nodes of an entry lane connected to an intersection and exit nodes of an exit lane connected to the intersection based on map data including information of the intersection, each of the entry nodes being an end node of the entry lane at the intersection and each of the exit nodes being an end node of the exit lane at the intersection; and
a setting unit that is configured to set virtual connection objects a number in accordance with a combination of the entry nodes and the exit nodes, the virtual connection objects each being a guide for the vehicle to travel and connecting the entry nodes and the exit nodes, wherein
for a combination of two virtual connection objects connecting different entry nodes and different exit nodes where simultaneous traffic by vehicles may occur according to a traffic rule, the setting unit is further configured to set the two virtual connection objects to be prohibited from partially crossing each other except for a combination of virtual connection objects between which crossing is physically unavoidable, wherein a combination of a virtual connection object that is a guide for right-turning travel from a specific side at the intersection and a virtual connection object that is a guide for right-turning travel from an opposing side at the intersection opposite to the specific side is defined as an opposing right-turn combination under a left-hand traffic environment, a combination of a virtual connection object that is a guide for left-turning travel from the specific side at the intersection and a virtual connection object that is a guide for left-turning travel from the opposing side at the intersection is defined as an opposing left-turn combination under a right-hand traffic environment, an avoidance condition is defined as at least one of a condition that the virtual connection objects are close to each other within an avoidance range and a condition that the virtual connection objects overlap with each other, and the setting unit is further configured to set the virtual connection objects to not satisfy the avoidance condition for at least one of the opposing right-turn combination and the opposing left-turn combination, wherein a travel trajectory for a vehicle is determined based on the virtual connection objects to not satisfy the avoidance condition, and the vehicle performs automated driving according to the travel trajectory.

11. A travel assistance device that assists in traveling for a vehicle, comprising:

a specifying unit that is configured to specify entry nodes of an entry lane connected to an intersection and exit nodes of an exit lane connected to the intersection based on map data including information of the intersection, each of the entry nodes being an end node of the entry lane at the intersection and each of the exit nodes being an end node of the exit lane at the intersection; and a setting unit that is configured to set virtual connection objects a number in accordance with a combination of the entry nodes and the exit nodes, the virtual connection objects each being a guide for the vehicle to travel and connecting the entry nodes and the exit nodes, wherein for a combination of two virtual connection objects connecting different entry nodes and different exit nodes where simultaneous traffic by vehicles may occur according to a traffic rule, the setting unit is further configured to set the two virtual connection objects to be prohibited from partially crossing each other except for a combination of virtual connection objects between which crossing is physically unavoidable, wherein a combination of a virtual connection object that is a guide for right-turning travel from a specific side to a right-turn side at the intersection and a virtual connection object that is a guide for left-turning travel from the right-turn side to the specific side at the intersection is defined as a first combination under a left-hand traffic environment, a combination of a virtual connection object that is a guide for left-turning travel from the specific side to a left-turn side at the intersection and a virtual connection object that is a guide for right-turning travel from the turn-left side to the specific side at the intersection is defined as a second combination under a right-hand traffic environment, an avoidance condition is defined as at least one of a condition that the virtual connection objects are close to each other within an avoidance range and a condition that the virtual connection objects overlap with each other, and the setting unit is configured set the virtual connection objects to not satisfy the avoidance condition for at least one of the first combination and the second combination, wherein a travel trajectory for a vehicle is determined based on the virtual connection objects to not satisfy the avoidance condition, and the vehicle performs automated driving according to the travel trajectory.

* * * * *